US011124692B2

United States Patent
Weers et al.

(10) Patent No.: US 11,124,692 B2
(45) Date of Patent: Sep. 21, 2021

(54) METHODS OF USING IONIC LIQUID BASED ASPHALTENE INHIBITORS

(71) Applicant: Baker Hughes Holdings LLC, Houston, TX (US)

(72) Inventors: Jerry Weers, Houston, TX (US); Henry Nguyen, Houston, TX (US); David Jennings, Houston, TX (US); Kung-Po Chao, Houston, TX (US)

(73) Assignee: BAKER Hughes Holdings LLC, Houston, TX (US)

( * ) Notice: Subject to any disclaimer, the term of this patent is extended or adjusted under 35 U.S.C. 154(b) by 0 days.

(21) Appl. No.: 16/213,890

(22) Filed: Dec. 7, 2018

(65) Prior Publication Data

US 2019/0177599 A1   Jun. 13, 2019

Related U.S. Application Data

(60) Provisional application No. 62/596,326, filed on Dec. 8, 2017, provisional application No. 62/696,544, filed (Continued)

(51) Int. Cl.
*C09K 8/524* (2006.01)
*C10L 1/14* (2006.01)
(Continued)

(52) U.S. Cl.
CPC .............. *C09K 8/524* (2013.01); *C10L 1/143* (2013.01); *C10L 1/1981* (2013.01); (Continued)

(58) Field of Classification Search
None
See application file for complete search history.

(56) References Cited

U.S. PATENT DOCUMENTS

| 4,892,944 A | 1/1990 | Mori et al. |
| 5,143,594 A | 9/1992 | Stephenson et al. |

(Continued)

FOREIGN PATENT DOCUMENTS

| CN | 1629257 A | 6/2005 |
| CN | 107177353 A | 9/2017 |

(Continued)

OTHER PUBLICATIONS

Amaraskekara, A. S., "Acidic Ionic Liquids", Chemical Reviews, American Chemical Society Publications, 2016 (50 pages).

(Continued)

*Primary Examiner* — John J Figueroa
(74) *Attorney, Agent, or Firm* — John Wilson Jones; Jones Delflache LLP

(57) ABSTRACT

Methods of treating a petroleum hydrocarbon fluid are described wherein the petroleum hydrocarbon fluid is contacted with an asphaltene inhibitor composition having an ionic liquid and an asphaltene inhibitor. The ionic liquid has a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene or a polyoxyalkylene group or a zwitterion; $R^8$ is a straight or branched $C_{1-30}$ alkylene, an alkylene oxyalkylene or an alkylene polyoxyalkylene; and the anion includes halides, hydroxyl, bicarbonate, carbonate, alkyl carbonates, alkoxides, carboxylates, hydroxycarboxylates or a combination thereof.

26 Claims, 4 Drawing Sheets

Related U.S. Application Data on Jul. 11, 2018, provisional application No. 62/596,303, filed on Dec. 8, 2017.

(51) Int. Cl.
  *C10L 1/198* (2006.01)
  *C10L 1/2383* (2006.01)
(52) U.S. Cl.
  CPC ..... *C10L 1/2383* (2013.01); *C10L 2200/0254* (2013.01); *C10L 2200/0259* (2013.01); *C10L 2230/08* (2013.01); *C10L 2270/026* (2013.01)

(56) References Cited

U.S. PATENT DOCUMENTS

| | | | |
|---|---|---|---|
| 5,354,453 A | 10/1994 | Bhatia | |
| 5,840,177 A | 11/1998 | Weers et al. | |
| 5,998,530 A | 12/1999 | Krull et al. | |
| 6,013,145 A | 1/2000 | Amo et al. | |
| 6,013,175 A | 1/2000 | Weers et al. | |
| 6,180,683 B1 | 1/2001 | Miller et al. | |
| 6,313,367 B1 | 11/2001 | Breen et al. | |
| 6,852,229 B2 | 2/2005 | Mehnert et al. | |
| 7,001,504 B2 | 2/2006 | Schoonover | |
| 7,432,409 B2 | 10/2008 | Elomari et al. | |
| 7,459,011 B2 | 12/2008 | Cadours et al. | |
| 7,470,829 B2 | 12/2008 | Cadours et al. | |
| 7,605,297 B2 | 10/2009 | Maase et al. | |
| 7,786,065 B2 | 8/2010 | Hecht et al. | |
| 7,880,024 B2 | 2/2011 | Lim et al. | |
| 7,918,905 B2 | 4/2011 | Kremer et al. | |
| 8,075,763 B2 | 12/2011 | Sneddon et al. | |
| 8,084,402 B2 | 12/2011 | Berry et al. | |
| 8,115,040 B2 | 2/2012 | Elomari et al. | |
| 8,123,930 B2 | 2/2012 | Cohrs et al. | |
| 8,168,830 B2 | 5/2012 | Armstrong et al. | |
| 8,461,382 B2 | 6/2013 | Kunz et al. | |
| 8,609,572 B2 | 12/2013 | Earl et al. | |
| 8,652,237 B2 | 2/2014 | Heldebrant et al. | |
| 8,679,203 B2 | 3/2014 | O'Brien et al. | |
| 8,758,600 B2 | 6/2014 | Koseoglu et al. | |
| 8,821,716 B2 | 9/2014 | Victorovna Likhanova et al. | |
| 8,858,803 B2 | 10/2014 | Guliashvili et al. | |
| 8,888,993 B2 | 11/2014 | Verma et al. | |
| 8,915,990 B2 | 12/2014 | Betting et al. | |
| 8,916,734 B2 | 12/2014 | Tang et al. | |
| 8,992,767 B2 | 3/2015 | Koseoglu et al. | |
| 9,157,034 B2 | 10/2015 | Martinez Palau et al. | |
| 9,249,261 B2 | 2/2016 | Anderson | |
| 9,267,082 B2 | 2/2016 | Braden et al. | |
| 9,328,295 B2 | 5/2016 | Gattupalli et al. | |
| 9,360,425 B2 | 6/2016 | Jennings et al. | |
| 9,394,617 B2 | 7/2016 | Hall et al. | |
| 9,404,052 B2 | 8/2016 | Flores Oropeza et al. | |
| 9,447,335 B2 | 9/2016 | Abai et al. | |
| 9,453,830 B2 | 9/2016 | Zhang et al. | |
| 9,464,239 B2 | 10/2016 | Nares Ochoa et al. | |
| 9,574,139 B2 | 2/2017 | Broderick et al. | |
| 9,587,182 B2 | 3/2017 | Flores Oropeza et al. | |
| 9,593,015 B2 | 3/2017 | Ballaguet et al. | |
| 9,611,209 B1 | 4/2017 | Liu et al. | |
| 9,611,434 B2 | 4/2017 | Morgan et al. | |
| 9,624,758 B2 | 4/2017 | Hardy et al. | |
| 9,637,676 B2 | 5/2017 | Leonard et al. | |
| 9,637,689 B2 | 5/2017 | Al-Hajji et al. | |
| 9,663,726 B2 | 5/2017 | Yang et al. | |
| 9,765,044 B2 | 9/2017 | Socha et al. | |
| 9,803,450 B2 | 10/2017 | Hardy et al. | |
| 9,850,197 B2 | 12/2017 | Martinez Palou et al. | |
| 9,856,422 B2 | 1/2018 | Hardacre et al. | |
| 9,926,775 B2 | 3/2018 | O'Rear et al. | |
| 10,000,641 B2 | 6/2018 | Miles et al. | |
| 10,093,868 B1 | 10/2018 | Weers et al. | |
| 10,174,429 B2 | 1/2019 | Kalakodimi et al. | |
| 10,174,439 B2 | 1/2019 | Kalakodimi et al. | |
| 10,179,879 B2 | 1/2019 | O'Rear et al. | |
| 10,246,629 B2 | 4/2019 | Gill | |
| 10,301,553 B2 | 5/2019 | Geissler et al. | |
| 10,858,604 B2 | 12/2020 | Ngyuen et al. | |
| 2003/0085156 A1 | 5/2003 | Schoonover | |
| 2003/0204041 A1 | 10/2003 | Laas et al. | |
| 2004/0044264 A1 | 3/2004 | Smith | |
| 2004/0188350 A1 | 9/2004 | Beste et al. | |
| 2005/0005840 A1 | 1/2005 | Bonrath | |
| 2005/0010076 A1 | 1/2005 | Wasserscheid et al. | |
| 2005/0241997 A1 | 11/2005 | Kremer et al. | |
| 2006/0054538 A1 | 3/2006 | Hsu et al. | |
| 2006/0070917 A1 | 4/2006 | McCarthy et al. | |
| 2006/0223995 A1 | 10/2006 | Uchimura et al. | |
| 2007/0062698 A1* | 3/2007 | Smith | C09K 8/035 166/279 |
| 2007/0123446 A1 | 5/2007 | Kenneally et al. | |
| 2007/0142211 A1 | 6/2007 | Elomari et al. | |
| 2007/0142642 A1 | 6/2007 | Szarvas et al. | |
| 2007/0221539 A1 | 9/2007 | Cohrs et al. | |
| 2008/0114105 A1 | 5/2008 | Hell et al. | |
| 2008/0251759 A1 | 10/2008 | Kalb et al. | |
| 2009/0090655 A1 | 4/2009 | Stark et al. | |
| 2009/0291872 A1 | 11/2009 | Bara et al. | |
| 2009/0320771 A1 | 12/2009 | Torres, Jr. et al. | |
| 2010/0093577 A1 | 4/2010 | Ritchie et al. | |
| 2010/0147022 A1 | 6/2010 | Hart et al. | |
| 2010/0217010 A1 | 8/2010 | Massonne et al. | |
| 2010/0270211 A1 | 10/2010 | Wolny | |
| 2010/0297532 A1 | 11/2010 | Beste et al. | |
| 2011/0172473 A1 | 7/2011 | Nguyen et al. | |
| 2011/0186515 A1 | 8/2011 | Lourenco-Guimaraes et al. | |
| 2012/0024751 A1 | 2/2012 | He et al. | |
| 2012/0031810 A1 | 2/2012 | Stark et al. | |
| 2012/0053101 A1 | 3/2012 | Yang et al. | |
| 2012/0186993 A1 | 7/2012 | Huang et al. | |
| 2012/0238764 A1 | 9/2012 | Klein et al. | |
| 2012/0255886 A1 | 10/2012 | Flores Oropeza et al. | |
| 2012/0321967 A1 | 12/2012 | Wolfe et al. | |
| 2013/0041159 A1 | 2/2013 | Siemer et al. | |
| 2013/0101460 A1 | 4/2013 | Ramachandran et al. | |
| 2013/0209324 A1 | 8/2013 | Timken et al. | |
| 2013/0288886 A1 | 10/2013 | Aduri et al. | |
| 2014/0007768 A1 | 1/2014 | van den Broeke et al. | |
| 2014/0045732 A1* | 2/2014 | Mazyar | E21B 43/16 507/242 |
| 2014/0158928 A1 | 6/2014 | Zhou et al. | |
| 2014/0170041 A1 | 6/2014 | Harrison et al. | |
| 2014/0299543 A1 | 10/2014 | Zhou et al. | |
| 2014/0350299 A1 | 11/2014 | Huo et al. | |
| 2014/0378718 A1 | 12/2014 | Gu et al. | |
| 2015/0047849 A1 | 2/2015 | Wicker, Jr. et al. | |
| 2015/0093313 A1 | 4/2015 | Broderick et al. | |
| 2015/0111799 A1 | 4/2015 | Miranda Olvera et al. | |
| 2015/0231529 A1 | 8/2015 | Akolekar et al. | |
| 2016/0001218 A1 | 1/2016 | Rota | |
| 2016/0032161 A1 | 2/2016 | Campbell et al. | |
| 2016/0075952 A1 | 3/2016 | Kim et al. | |
| 2016/0146734 A1 | 5/2016 | Felipe et al. | |
| 2016/0175737 A1 | 6/2016 | Hembre et al. | |
| 2016/0177691 A1* | 6/2016 | Benson | E21B 43/2406 166/272.3 |
| 2016/0185732 A1 | 6/2016 | Pommersheim | |
| 2016/0230101 A1 | 8/2016 | Nguyen et al. | |
| 2016/0326432 A1 | 11/2016 | Felipe et al. | |
| 2016/0367976 A1 | 12/2016 | Uppara et al. | |
| 2017/0077557 A1 | 3/2017 | Zheng et al. | |
| 2017/0096606 A1 | 4/2017 | Pinappu et al. | |
| 2017/0101375 A1 | 4/2017 | Poshusta et al. | |
| 2017/0107162 A1 | 4/2017 | Duggal et al. | |
| 2017/0114001 A1 | 4/2017 | Atkins et al. | |
| 2017/0222266 A1 | 8/2017 | Zheng et al. | |
| 2017/0343526 A1 | 11/2017 | Cooks et al. | |
| 2019/0048712 A1 | 2/2019 | Jennings et al. | |
| 2019/0127639 A1 | 5/2019 | Moloney et al. | |
| 2019/0127640 A1 | 5/2019 | Moloney et al. | |
| 2019/0177599 A1 | 6/2019 | Weers | |
| 2019/0177622 A1 | 6/2019 | Weers | |

(56) References Cited

U.S. PATENT DOCUMENTS

| | | |
|---|---|---|
| 2020/0017776 A1 | 1/2020 | Weers |
| 2020/0017790 A1 | 1/2020 | Weers |
| 2020/0077766 A1 | 1/2020 | Weers |

FOREIGN PATENT DOCUMENTS

| | | |
|---|---|---|
| CN | 108148565 A | 6/2018 |
| GB | 2304729 A | 8/1996 |
| GB | 2564735 A | 1/2019 |
| WO | 02/34863 A1 | 5/2002 |
| WO | 03/051894 A1 | 6/2003 |
| WO | 2003051894 A1 | 6/2003 |
| WO | 2007/138307 A2 | 12/2007 |
| WO | 2008052860 A1 | 5/2008 |
| WO | 2009040242 A1 | 4/2009 |
| WO | 2012123336 A1 | 9/2012 |
| WO | 2013096217 A1 | 6/2013 |
| WO | 2013096218 A1 | 6/2013 |
| WO | 2013171060 A1 | 11/2013 |
| WO | 2016189333 A1 | 5/2015 |
| WO | 2016189333 A1 | 12/2016 |
| WO | 2017105476 A1 | 6/2017 |
| WO | 2017136728 A1 | 8/2017 |
| WO | 2020014510 A1 | 1/2020 |
| WO | 2020014529 A1 | 1/2020 |
| WO | 2020014534 A1 | 1/2020 |
| WO | 2020036698 A2 | 2/2020 |

OTHER PUBLICATIONS

Balsamo, M, et al., "Chemical Demulsification of Model Water-in-oil Emulsions with Low Water Content by Means of Ionic Liquids," Brazilian Journal of Chemical Engineering, vol. 34, No. 1, pp. 273-282, 2017 (10 pages).

Falkler, T., et al., "Fine-tune processing heavy crudes in your facility," Hydrocarbon Processing, Refining Developments, Sep. 2010 (6 pages).

Flores, Cesar A., et al., "Anion and cation effects of ionic liquids and ammonium salts evaluated as dehydrating agents for super-heavy crude oil: Experimental and theoretical points of view," Elsevier, Journal of Molecular Liquids 2014 (9 pages).

Ghandi, K., "A Review of Ionic Liquids, Their Limits and Applications," Green and Sustainable Chemistry, 2014, Jan. 4, 2014, (10 pages).

Hazrati, N., et al., Demulsification of water in crude oil emulsion using long chain imidazolium ionic liquids and optimization of parameters, Elsevier, Fuel 229, 126-134, 2018 (9 pages).

Ibrahim, M.H., "The role of ionic liquids in desulfurization of fuels: a review", Elsevier, Renewable and Sustainable Energy Reviews, 2017, 1534-1549 (16 pages).

Jennings, D.W., "MS New Dead-Crude Oil Asphaltene Inhibitor Test Method," OTC-25113-MS, 2014 (14 pages).

Papaiconomou, N., et al., "Selective Extraction of Copper, Mercury, Silver, and Palladium Ions from Water Using Hydrophobic Ionic Liquids," Ind. Eng. Chem Res, 2008, 47, 5080-5086 (7 pages).

Shah, S., N., "Extraction of Naphthenic Acid from Highly Acidic Oil Using Hydroxide-Based Ionic Liquids," ACS Publications 2014, 106-111 (6 pages).

Sulemana, N.T., et al., "Application of Ionic Liquids in the Upstream oil Industry—A Review", International Journal of Petrochemistry and Research, vol. 1, Issue 1, 2017, 50-60 (10 pages).

Velusamy, S., et al., "Substantial Enhancement of Heavy Crude Oil Dissolution in Low Waxy Crude Oil in the Presence of Ionic Liquid," Industrial & Engineering Chemistry Research, 2015, 7999-8009 (11 pages).

"Hydrogen Sulfide and Mercaptan Sulfur in Liquid Hydrocarbons," UOP Method 163-89, 1989 (7 pages).

Standard Test Method for Acid Number of Petroleum Products by Potentiometric Titration, ASTM, D-664-07, Designation 177/96, 2007 (8 pages).

Anderson, K., et al., "Naphthenic acid extraction and speciation from Doba crude oil using carbonate-based ionic iquids," Fuel, 146 (2015) 60-68.

Biniaz, P., et al., "Demulsification of water in oil emulsion using ionic liquids: Statistical modeling and optimization," Fuel 184 (2016) 325-333.

Boukherissa, M. et al., "Ionic Liquids as Dispersants of Petroleum Asphaltenes," Energy & Fuels (2009), 23, 2557-2564.

Hallett, J.P., et al., Room-Temperature Ionic Liquids: Solvents for Synthesis and Catalysis. 2, Amer. Chem. Soc. Jublications, Chemical Reviews (2011) pp. 3508-3576.

Hu, Y, et al., "Effect of the Structures of Ionic Liquids and Alkylbenzene-Derived Amphiphiles on the Inhibition of Asphaltene Precipitation from Co2-Injected Reservoir Oils," Amer. Chem. Soc. Publications, (2005) 8168-8174.

Nezhad, E.R., et al., "Dispersing of Petroleum Asphaltenes by Acidic Ionic Liquid and Determination by UV-Visible Spectroscopy," Journal of Petroleum Engineering, vol. 2013, Article ID 203036, pp. 1-5 (2013).

Pereira, J.C., et al., "Resins: The Molecules Responsible for the Stability/Instability Phenomena of Asphaltenes," Energy & Fuels (2007), 21, 1317-1321.

Sakthivel, S., et al., Experimental Investigation on the Effect of Aliphatic Ionic Liquids on the Solubility of Heavy Crude Oil Using UV-Visible, Fourier Transform-Infrared, and 13C NMR Spectroscopy, (2014), Amer. Chem. Soc. Publications, pp. 6151-6162.

Shaban, S., et al., "Upgrading and Viscosity Reduction of Heavy Oil by Catalytic Ionic Liquid," (2014) Amer. Chem. Soc., pp. 6545-6553.

Subramanian, D. et al., "Ionic liquids as viscosity modifiers for heavy and extra-heavy crude oils," Fuel 143 (2015), 519-526.

Atta, A.M., et al. Application of new amphiphilic IL based on ethoxylated octadecylammonium tosylate demulsifier and crude oil spill dispersant, J. Industrial Engineering Chem., vol. 33, p. 122 (2016).

Yang, D., et al., "Comparison of the corrosion inh properties of imidazole based ionic liquids on API X52 steel in carbon dioxide saturated NaCL solution," Corrosion 2014, SPE Paper 4357.

Sakthivel, S., et al., "Nature Friendly Application of Ionic Liquids for Dissolution Enhancement of Heavy Crude Oil" SPE Paper 178418-MS (2015), Society of Petroleum Engineers.

Sakthivel, S., "Eco-Efficient Method for the Dissolution Enhancement of Heavy Crude Oil Using Ionic Liquids", SPE Paper 175160-MS (2015) Society of Petroleum Engineers.

\* cited by examiner

METHODS OF USING IONIC LIQUID BASED ASPHALTENE INHIBITORS

FIELD OF THE DISCLOSURE

The disclosure relates to an asphaltene inhibitor composition, a method of treating a petroleum hydrocarbon fluid with the composition and a method of inhibiting or preventing the formation or precipitation of asphaltenes during the production and recovery of petroleum hydrocarbon fluids from reservoirs.

BACKGROUND OF THE DISCLOSURE

Petroleum crude are complex mixtures containing many different hydrocarbons differing in appearance and ranging in consistency from water to tar-like solids. The high viscosity of heavy crude is due, at least partially, to the presence of asphaltenes. Asphaltenes are further known to adversely impact the viscoelasticity and flow behavior of petroleum crude.

Asphaltene precipitates are known to flocculate and form deposits in diverse locations during petroleum production operations. In oil-producing subterranean formations, the extraction of oil is made difficult by the presence of agglomerates of such deposits in the pores of the formation. Such deposits are also known to coat boreholes. In some instances, asphaltene precipitates block production routes and tubing by solidifying on the surface of downhole equipment. At times, the presence of asphaltene deposits cause reduction or complete stoppage of production. In addition, such deposits have been known to greatly shorten the productive life of the well.

In addition to operational concerns, asphaltene deposits are known to cause safety issues during hydrocarbon production and processing. In some cases, for instance, asphaltenes cause failure of critical safety valves.

Adverse effects of asphaltene precipitates are further evident during the refining of petroleum. For instance, asphaltenes are known to be responsible for catalyst poisoning, coke formation, and fouling in heat exchangers.

In the past, much effort has been focused on the development of treatment agents which adequately address the problems caused by asphaltene deposits. Such treatment agents include those which inhibit by either preventing or reducing asphaltene deposition and/or accumulation. Asphaltenes are highly complex heterocyclic macromolecules. While some treatment agents show success in inhibiting the deposition of some asphaltenes, there are many instances where their success has been sharply curtailed. Improved compositions for inhibiting the deposition and/or accumulation of asphaltenes is therefore desired.

SUMMARY OF THE DISCLOSURE

In an embodiment, the disclosure relates to a method of enhancing the performance of an asphaltene inhibitor during production, storage, transportation or refining of a petroleum hydrocarbon fluid is provided. In this method, the asphaltene inhibitor is contacted with an ionic liquid during a production or refining operation or prior to or during storage or transportation of the petroleum hydrocarbon fluid. The ionic liquid has a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene or a polyoxyalkylene group or a zwitterion; $R^8$ is a straight or branched $C_{1-30}$ alkylene, an alkylene oxyalkylene or an alkylene polyoxyalkylene; and the anion includes halides, hydroxyl, bicarbonate, carbonate, alkyl carbonates, alkoxides, carboxylates, hydroxycarboxylates or a combination thereof.

In another embodiment, the disclosure relates to an asphaltene inhibitor composition which comprises an ionic liquid and an asphaltene inhibitor. The ionic liquid has a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene or a polyoxyalkylene group or a zwitterion; $R^8$ is a straight or branched $C_{1-30}$ alkylene, an alkylene oxyalkylene or an alkylene polyoxyalkylene; and the anion includes halides, hydroxyl, bicarbonate, carbonate, alkyl carbonates, alkoxides, carboxylates, hydroxycarboxylates or a combination thereof.

In another embodiment of the disclosure, a petroleum hydrocarbon fluid is provided which contains the asphaltene inhibitor composition described in the paragraphs above.

In another embodiment, a method of enhancing the productivity of a petroleum hydrocarbon fluid produced from a subterranean formation is provided. In this embodiment, the asphaltene inhibitor composition described in the paragraphs above is pumped into the well. The asphaltene inhibitor composition inhibits, reduces or prevents the formation, agglomeration and/or accumulation of asphaltene from the produced fluid. The asphaltene inhibitor composition may further prevent or reduce precipitation of asphaltene from the petroleum hydrocarbon fluid.

In another embodiment of the disclosure, a method of inhibiting, reducing or preventing the formation, agglomeration and/or accumulation of asphaltene deposits in an underground reservoir, onto a conduit or vessel or in a refinery is provided. In this embodiment, the petroleum hydrocarbon fluid in the underground reservoir, conduit, vessel or refinery is contacted with the asphaltene inhibitor composition described in the paragraphs above. Contact of the fluid with the asphaltene inhibitor composition in the reservoir, conduit, vessel or within the refinery further may inhibit, prevent or reduce precipitation of asphaltene from the fluid.

In another embodiment, a method of improving the stability of a petroleum hydrocarbon fluid is provided, wherein the petroleum hydrocarbon fluid is contacted with the asphaltene inhibitor composition described in the paragraphs above.

In another embodiment, a method of treating a petroleum hydrocarbon fluid is provided wherein the fluid is contacted with a phenol aldehyde resin and an ionic liquid. The ionic liquid has a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene or a polyoxyalkylene group or a zwitterion; $R^8$ is a straight or branched $C_{1-30}$ alkylene, an alkylene oxyalkylene or an alkylene polyoxyalkylene; and the anion includes halides, hydroxyl, bicarbonate, carbonate, alkyl carbonates, alkoxides, carboxylates, hydroxycarboxylates or a combination thereof.

In another embodiment, an asphaltene inhibitor composition is provided which comprises a phenol aldehyde resin; and an ionic liquid having a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene or a polyoxyalkylene group or a zwitterion; $R^8$ is a straight or branched $C_{1-30}$ alkylene, an alkylene oxyalkylene or an alkylene polyoxyalkylene; and the anion includes halides, hydroxyl, bicarbonate, carbonate, alkyl carbonates, alkoxides, carboxylates, hydroxycarboxylates or a combination thereof.

BRIEF DESCRIPTION OF THE DRAWINGS

The following figures are part of the present specification, included to demonstrate certain aspects of various embodiments of this disclosure and referenced in the detailed description herein. With reference to the accompanying drawings, like elements are numbered alike.

DETAILED DESCRIPTION OF THE PREFERRED EMBODIMENTS

Figure 1:
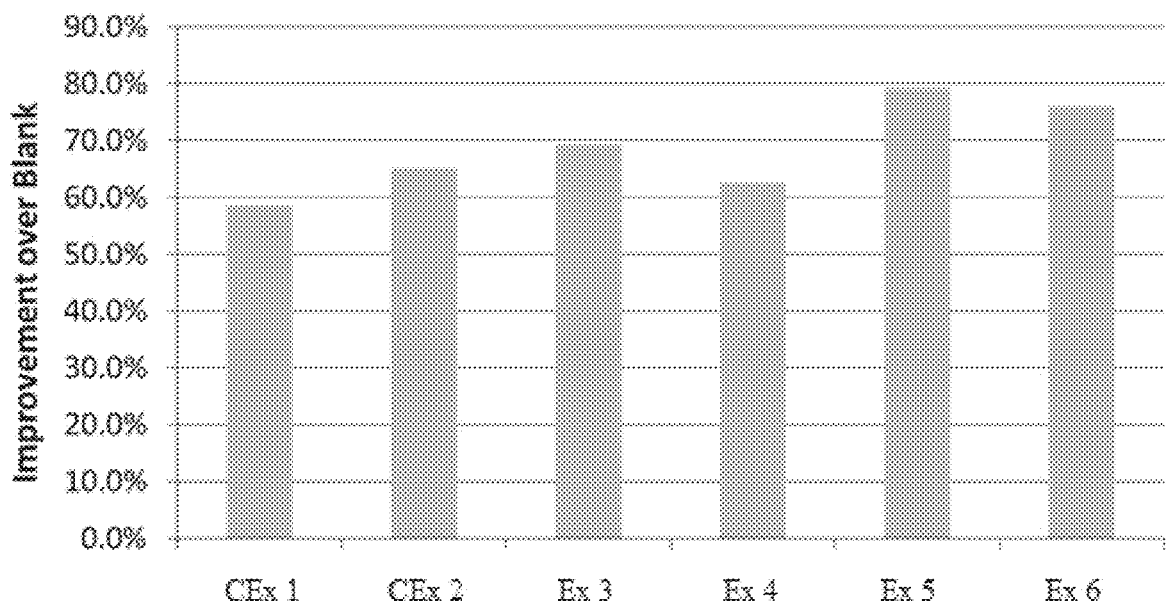
FIG. 1 shows the Analytical Centrifuge Stability Analysis for Asphaltenes (ACSAA) test results at 25° C. on Crude Oil #1 treated with phenol aldehyde resin asphaltene inhibitor #1 alone or in combination with a polyamine additive or different ionic liquid synergists.

Characteristics and advantages of this disclosure and additional features and benefits will be readily apparent to those skilled in the art upon consideration of the following detailed description of exemplary embodiments. The description provides specific details, such as material types, compositions, and processing conditions in order to provide a thorough description of embodiments of the disclosure. Only those process acts, formulae and structures necessary to understand the embodiments of the disclosure are described in detail below.

It should be understood that the description herein, being of exemplary embodiments, is not intended to limit the claims of this patent. On the contrary, the intention is to cover all modifications, equivalents and alternatives falling within the spirit and scope of the claims.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not limit the present disclosure or appended claims to only one such component or aspect, but should be interpreted generally to mean one or more, as may be suitable and desirable in each particular instance.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the dispersant(s) includes at least one dispersant). "Optional" or "optionally" means that the subsequently described parameter may or may not be present, and that the description includes instances where the parameter occurs and instances where it does not. As used herein, "combination" is inclusive of components, blends, mixtures, complexes, reaction products, and the like. All references are incorporated herein by reference.

The use of the terms "a" and "an" and "the" and similar referents in the context of describing the disclosure (especially in the context of the following claims) are to be construed to cover both the singular and the plural, unless otherwise indicated herein or clearly contradicted by context.

As used herein, "petroleum hydrocarbon fluid" shall include crude oil, shale oil, shale gas condensate, bitumen, diluted bitumen (dil-bit), refinery fractions including distillates including coker distillates, alkylates, finished fuel including diesel fuel, petroleum fuel and biofuel, finished petroleum products, reformates, cycle oil, residual oil, fuel gas, flare gas, propane, butane, liquefied petroleum gas (LPG), natural gas condensate, natural gas liquid (NGL) and combinations thereof. The asphaltene inhibitor compositions described herein are especially useful with crude oil, bitumen, diesel fuel, petroleum fuel, biofuel, residual oil, fuel gas, flare gas, propane, butane, liquefied petroleum gas (LPG), natural gas liquid (NGL) and refinery fractions (including gas oils and light lubricating oils) and combinations thereof. In addition, any of these may contain water, brines, gases such as hydrocarbon gases, or a combination thereof.

As used herein, "asphaltene inhibitor" shall include a treatment agent which inhibits, prevents or reduces the formation, agglomeration and/or accumulation of asphaltene deposits as well as a treatment agent which inhibits, prevents or reduces precipitation of asphaltene.

As used herein, "asphaltene inhibitor composition" shall refer to the product resulting from contact of an asphaltene inhibitor and an ionic liquid. The phrase shall include blends, mixtures, complexes and reaction products of the ionic liquid and the asphaltene inhibitor.

As used herein, the word "conduit" shall refer to any pipeline, pipe, tubular, flow conduit, thoroughfare or other artery in which a chemical, including a petroleum hydrocarbon fluid, travels or contacts. The word "vessel" shall include any equipment or container in which a petroleum hydrocarbon fluid is in contact, such as heat exchangers, etc. The site of the "conduit" or "vessel" shall include, but not be restricted to reservoirs, wells, pipelines and thoroughfares leading to or from an underground reservoir (including wells), refineries, fluid processing facilities, storage containers and transport containers.

The addition of the defined ionic liquids to conventional asphaltene inhibitors improves asphaltene stabilization and inhibition when compared to use of the conventional asphaltene inhibitor by itself. The improvement is noted in produced fluids recovered from the reservoir, in processed fluids, fluids stored in vessels as well as shipped fluids. The amount of asphaltene deposits formed during the production, processing, storage or transit of the petroleum hydrocarbon fluid is less when the petroleum hydrocarbon fluid is treated with the ionic liquid/asphaltene inhibitor mixture than when the asphaltene inhibitor is used by itself. The amount of agglomerates or accumulates of asphaltene deposits formed during the production, processing, storage or transit of the petroleum hydrocarbon fluid is less when the petroleum hydrocarbon fluid is treated with the ionic liquid/asphaltene inhibitor mixture than when the asphaltene inhibitor is used by itself. The amount of asphaltene precipitated from a petroleum hydrocarbon fluid during production, processing, storage or transit is less when the petroleum hydrocarbon fluid is treated with the ionic liquid/asphaltene inhibitor mixture than when the asphaltene inhibitor is used by itself.

The results are particularly surprising because the ionic liquids do not show improvement in asphaltene stability. More effective and more efficient control of asphaltene deposition, accumulation and/or agglomeration in crude oil production, storage, transportation and refining may therefore be provided.

For example, phenol aldehyde resins are often used as asphaltene stabilizers and inhibitors to reduce deposition and improve asphaltene-related fluid processing problems. Phenol aldehyde resins are often used with amine or polyamine additives. While the ionic liquids do not by themselves improve asphaltene stability, when the ionic liquids are used in combination with the phenol aldehyde resins (with or without amine or polyamine additives) asphaltene deposition, agglomeration as well as accumulation of deposits is inhibited or reduced and asphaltene stability in petroleum hydrocarbon fluids is greatly improved. Precipitation of asphaltenes from petroleum hydrocarbon fluids is also noted.

In a preferred embodiment, the ionic liquids are used to enhance the performance of an asphaltene inhibitor during production of petroleum hydrocarbon fluids, processing of petroleum hydrocarbon fluids (including processing within a refinery), storage of the petroleum hydrocarbon fluid as well as during transit of the petroleum hydrocarbon fluid. Contact of the ionic liquid with the asphaltene inhibitor effectively inhibits, reduces, prevents and/or controls the deposition, accumulation and/or agglomeration of asphaltene as well as in produced fluids, processed fluids, stored fluids and shipped fluids.

The asphaltene inhibitor composition stabilizes the petroleum fluid during production, processing, storage and transport by minimizing the formation or precipitation of asphaltenes. In addition, the asphaltene inhibitor composition minimizes precipitation of asphaltenes.

In a preferred embodiment, the asphaltene inhibitor composition may be introduced into the reservoir during a well treatment operation. In addition, to reducing, inhibiting or preventing the deposition, agglomeration or accumulation of asphaltene deposits in produced fluids, the composition minimizes formation and precipitation of deposits and agglomerates onto the surfaces of flow conduits and vessels and onto the borehole during production of the crude.

Typically, the composition is introduced into the reservoir during a drilling, completion or stimulation operation (including fracturing, acidizing, etc.). In an embodiment, the asphaltene inhibitor composition may be prepared off-site or on the fly and then pumped into the reservoir. Alternatively, the asphaltene inhibitor and ionic liquid may be pumped into the reservoir simultaneously or during separate pumping stages.

Any known method of introducing the asphaltene inhibitor composition into the reservoir can be used. For example, a squeeze process can be used to deliver the asphaltene inhibitor composition into the reservoir. In another embodiment, the asphaltene inhibitor composition may be applied in a continuous or batch injection process through a capillary line, down the backside of the well annulus, through an umbilical line, or through an umbilical/capillary line combination.

In addition to being contacted with the asphaltene inhibitor in a reservoir, the ionic liquid may be contacted with the asphaltene inhibitor during refining of the petroleum hydrocarbon fluid, during transport or storage of the petroleum hydrocarbon fluid or during any period in between. In such instances, the ionic liquid and asphaltene inhibitor may be introduced to the petroleum fluid in a storage tank, transit vessel, conduit or vessel, processing unit, refinery stream etc. and in separate streams. Alternatively, the asphaltene inhibitor composition may be first prepared and then introduced. Contact of the ionic liquid and asphaltene inhibitor (when introduced as either separate streams or as an asphaltene inhibitor composition) inhibits, prevents or reduces the deposition, agglomeration or accumulation of asphaltene deposits onto the surface of the conduit, vessel or tank. The conduit or tank is typically composed of a metal and the vessel is typically composed of metal, plastic or glass.

Contacting of the ionic liquid and the asphaltene inhibitor can be at a temperature of about −50° C. to about 250° C., for example about −5° C. to about 200° C. or about 20° C. to about 150° C., and a pressure of about 14.7 pounds per square inch absolute (psia) to about 40,000 psia or about 14.7 psia to about 20,000 psia.

During production, processing, storage and transit, the stability of the petroleum hydrocarbon fluid is greatly enhanced by the presence of the asphaltene inhibitor composition. A petroleum hydrocarbon fluid containing the asphaltene inhibitor composition is more stable than a similar fluid which differs only by the absence of the ionic liquid. Contacting the fluid with the ionic liquid and asphaltene inhibitor provides greater stabilization to the petroleum hydrocarbon fluid by reducing asphaltene deposition/accumulation (in terms of amount, tendency, and/or the rate of deposition/accumulation). Production, processing, storage and transit of petroleum hydrocarbon fluids is therefore improved by the asphaltene inhibiting composition described herein.

The synergy provided by the asphaltene inhibiting composition may be noted from the amount of asphaltenes deposited when the asphaltene in inhibitor is used by itself versus when the asphaltene inhibiting composition described herein is used in its place. Further, the effectiveness of the combination of ionic liquid and the asphaltene inhibitor is significantly increased over each of the components used alone. In one non-limiting example, the activity or effectiveness of the asphaltene inhibitor increases by at least 25% and sometimes 50% or higher when it is used in combination with the ionic liquid. As an example of the synergy, the combination of the ionic liquid and the asphaltene inhibitor increases the overall efficiency in inhibiting or preventing the formation of deposits or agglomerates of asphaltenes versus when either component is used separately.

Typically, the weight ratio of the asphaltene inhibitor to the ionic liquid in the asphaltene composition is about 5:95 to about 3:1.

In some instances, the asphaltene inhibitor and the ionic liquid constitutes a blend, the blend exhibiting the stated synergy. In other instances, the synergy is noted by the formation of a complex between the ionic liquid and the asphaltene inhibitor.

In other instances, contact of the ionic liquid with the asphaltene inhibitor and the ionic liquid in the forms a reaction product. The synergy of the asphaltene inhibitor and the ionic liquid in the reaction product is noted by its enhanced effectiveness compared to when the ionic liquid or asphaltene inhibitor is used by itself. In some instances, the amount of asphaltene inhibitor in the reaction product may be from about 3 to about 99 weight percent.

As used herein, the ionic liquids have a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene, a polyoxyalkylene group or a zwitterion (such as those from oxyalkylation of an amine with an alkylene oxide); $R^8$ is a straight or branched $C_{1-30}$ alkylene, an alkylene oxyalkylene or an alkylene polyoxyalkylene; and the anion includes halides, hydroxyl, bicarbonate, carbonate, alkyl carbonates, alkoxides, carboxylates, hydroxycarboxylates or a combination thereof.

For the basic anions, alkyl carbonates can be of the formula $ROCO_2^-$, where R is a halogenated or non-halogenated linear or branched alkyl, or hydroxyl alkyl group, preferably a halogenated or non-halogenated linear or branched $C_{1-8}$ or $C_{1-5}$ alkyl group. Exemplary alkyl carbonates are those selected from methyl, ethyl, propyl, butyl, 2-ethylhexyl, octyl, ethylene and propylene carbonate.

Exemplary carboxylates include formate, acetate, propionate, octanoate, laurate, benzoate, n-butyrate, isobutyrate, pivalate, as well as $C_{18}$ fatty acids such as oleate, linoleate and stearate. Exemplary hydroxycarboxylates include glycolate, lactate, citrate, glucarate and gluconate.

Alkoxides are of the formula $RO^-$ where R is $C_{1-18}$ alkyl, $C_{6-12}$ aryl, or $C_{5-12}$ cycloalkyl. Exemplary alkoxides are tert-butoxide, n-butoxide, isopropoxide, n-propoxide, isobutoxide, ethoxide, methoxide, n-pentoxide, isopentoxide, 2-ethylhexoxide, 2-propylheptoxide, nonoxide, octoxide, decoxide and isomers thereof. Preferably, the alkoxides are tert-butoxide, isopropoxide, ethoxide, or methoxide. Tert-butoxide and methoxide are specifically mentioned. The alkoxides may further be ethylene or propylene oxide homopolymers, copolymers or terpolymers (which may optionally be crosslinked. Suitable crosslinking agents include bisphenol A or maleic anhydride.

In specific embodiments, the basic anions include hydroxide, bicarbonate, methyl carbonate, tert-butoxide, methoxide, or a combination thereof. Hydroxide is specifically mentioned.

As used herein, the term "alkyl" refers to a straight or branched chain, saturated monovalent hydrocarbon group regardless whether straight or branched chain is specifically mentioned or not; "aryl" refers to an aromatic monovalent group containing only carbon in the aromatic ring or rings; "arylalkyl" refers to an alkyl group that has been substituted with an aryl group, with benzyl being an exemplary arylalkyl group; "alkylbenzyl" refers to a benzyl group that has been substituted with an alkyl group in the aromatic ring; "hydroxyalkyl" refers to an alkyl group that has been substituted with a hydroxyl group with 2-hydroxyethyl as an exemplary hydroxyalkyl group; "hydroxyalkylbenzyl" refers to a benzyl group that has been substituted with a hydroxyalkyl group as defined herein in the aromatic ring; "alkylene" refers to a straight or branched chain, saturated, divalent hydrocarbon group, and "alkenyl" refers to a straight or branched chain monovalent hydrocarbon group having at least two carbons joined by a carbon-carbon double bond. The term "substituted" as used herein means that at least one hydrogen on the designated atom or group is replaced with another group, provided that the designated atom's normal valence is not exceeded. Substituted with a group means substituted with one or more groups.

As used herein, an oxyalkylene includes those of the formula $HO-R^{11}-$ where $R^{11}$ is a $C_2-C_{10}$ alkylene group (including oxirane and methyl oxirane), especially ethylene, propylene, i-propylene or butylene.

As used herein, a polyoxyalkylene group has a formula $H-[O-R^{10}-]_z$ where each occurrence of $R^{10}$ is independently a $C_{1-10}$ alkylene, specifically ethylene, propylene, i-propylene, butylene as well as oxirane and methyl oxirane or a combination thereof and z is an integer greater than 1 such as 2 to 30, 4 to 25, or 8 to 25. Further, the polyoxyalkylene group may be a homopolymer or copolymer of the formula $H(O-R^{11})_x-[O-R^{11}-]_y$ where x and y are independently selected from 1 to 1500 and each $R^{11}$ is independently as defined above. For example, the polyoxyalkylene group may of the formula $H(OCH_2CH_2)_x(CH_2CHCH_3O)_y$.

An alkylene polyoxyalkylene group has a formula $-R^{12}-[O-R^{13}-]_y$, wherein $R^{12}$ is a $C_{1-30}$ alkylene (including oxirane and methyl oxirane), each occurrence of $R^{13}$ is independently a $C_{1-10}$ alkylene or $C_{2-6}$ alkylene (including oxirane and methyl oxirane), especially ethylene, propylene, i-propylene, or butylene, and y is an integer from 1 to 500, such as 2 to 30, 4 to 25, or 8 to 25.

An alkylene oxyalkylene group has a formula of $-R^{14}-O-R^{15}-$, wherein $R^{14}$ and $R^{15}$ are each independently a $C_{1-20}$, or $C_{1-10}$, or $C_{1-5}$ branched or straight chain alkylene (including oxirane and methyl oxirane). In a particular embodiment, $R^{14}$ and $R^{15}$ are ethylene.

In an embodiment, at least one of $R^1$, $R^2$, $R^3$, $R^4$, $R^5$, $R^6$ and $R^7$ is —H or a $C_{1-20}$ alkyl. In an embodiment, at least one of the R groups is a $C_{6-20}$ alkyl and in another embodiment, at least one of the R groups is a $C_{6-12}$ alkyl. In another embodiment, at least two R groups are each independently a $C_{2-20}$ alkyl. In another embodiment, at least two R groups are each independently a $C_{6-20}$ alkyl. In still another embodiment, at least one R group is a $C_{6-20}$ alkyl and at least one of the remaining R groups is a $C_{1-6}$ alkyl or a $C_{1-3}$ alkyl. In still another embodiment, at least two R groups are each independently a $C_{6-20}$ alkyl, and at least one of the remaining R groups is a $C_{1-6}$ alkyl or a $C_{1-3}$ alkyl. In a further embodiment, at least two R groups are each independently a $C_{6-20}$ alkyl, and at least two remaining R groups are a $C_{1-6}$ alkyl or a $C_{1-3}$ alkyl.

Preferably the ionic liquids are basic ionic liquids. As used herein, ionic liquids generally are salts with melting points below 100° C. They have low vapor pressures and are environmentally more benign than other organic solvents, such as volatile aromatics and alkanes. Properties of ionic liquids can be customized by choosing the appropriate combination of anion and cation for specific applications. Specific exemplary basic ionic liquids include, but are not limited to, dicocodimethyl ammonium hydroxide, ditallowdimethyl ammonium hydroxide, tributylmethylammonium methyl carbonate, tetraethylammonium bicarbonate, tetrabutylammonium hydroxide, tallowtrimethyl ammonium hydroxide, cocotrimethyl ammonium hydroxide, hydrogenated tallow trimethyl ammonium hydroxide, dihydrogenated tallow dimethyl ammonium hydroxide, oxydiethylene bis(cocodimethylammonium hydroxide), or a combination thereof. Dicocodimethyl ammonium hydroxide, ditallowdimethyl ammonium hydroxide are specifically mentioned. As used herein, oxydiethylene bis(cocodimethylammonium hydroxide) refers to an ionic liquid having a structure represented by the formula: $Coco(CH_3)_2N^+(CH_2)_2O(CH_2)_2N^+(CH_3)_2Coco\ (OH^-)_2$.

In an embodiment, ionic liquids having a cation of dicocodimethyl ammonium and ditallowdimethyl ammonium is preferred.

The ionic liquid may be combined with a treatment agent capable of inhibiting, reducing or preventing the formation or agglomeration of asphaltene deposits. The treatment agent may further be capable of inhibiting, reducing or preventing precipitation of asphaltenes in the petroleum hydrocarbon fluid. In an embodiment, the treatment may be capable of inhibiting, reducing or preventing precipitation from the petroleum hydrocarbon fluid.

The treatment agent may be an asphaltene stabilizer and/or asphaltene inhibitor known in the art to reduce deposition and improve asphaltene-related fluid processing problems. As stated, the ionic liquids as described herein, when used together with the asphaltene treatment agent, improve asphaltene stabilization and inhibition.

Suitable asphaltene inhibitors include, but are not limited to, phenol aldehyde resins, fatty ester homopolymers and copolymers (such as fatty esters of acrylic and methacrylic acid polymers and copolymers) and sorbitan monooleate, alkoxylated fatty amines and fatty amine derivatives, optionally in combination with an organic metal salt.

The phenol aldehyde resins include polymers or oligomers derived from substituted-monophenols or unsubstituted-monophenols and an aldehyde. The monophenol substituents can be attached to the para, ortho, or both positions of the monophenol. Preferably the substituents are attached to the para position of the monophenol. The substituted monophenol can be an alkyl substituted monophenol. The alkyl may be branched (an alkyl group having an alkyl substituent). The alkyl substituents include $C_{1-20}$, $C_{4-18}$, or $C_{4-12}$ branched or linear alkyl groups.

The phenol aldehyde resins can be derived from a single substituted-monophenol or from combinations of two or more different substituted-monophenols or unsubstituted monophenol and an aldehyde. The molar ratio of the two or more different substituted-monophenols or unsubstituted monophenol are not particularly limited.

A phenol having a branched alkyl group can refer to any of its branched isomers thereof or combinations thereof. For example, a branched alkyl phenol can refer to any of its isomers having a branched substituent or any combination of such isomers.

Exemplary phenols having branched alkyl groups include branched dodecyl phenol, branched nonyl phenol, tert-butylphenol, t-amyl phenol, and branched hexyl phenols such as 4-(1-methylpentyl) phenol, 4-(1,2-dimethylbutyl) phenol, 4-(1-ethyl, 2-methylpropyl) phenol, 4-(1, 3-dimethylbutyl) phenol, and 4-(1-ethylbutyl) phenol, and) phenol.

Exemplary aldehydes include formaldehyde, paraformaldehyde, acetaldehyde, propionaldehyde, butyraldehyde, glyoxal, glutaraldehyde, 1,9-nonanedial, or a combination thereof. Formaldehyde is specifically mentioned.

In an embodiment, the phenol aldehyde resins are derived from formaldehyde and a single substituted monophenol and have the formula:

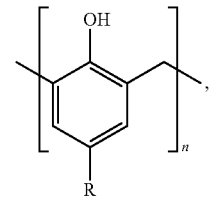

wherein R is $C_{1-20}$, $C_{4-18}$, or $C_{4-12}$ branched or linear alkyl groups, and n is an integer of greater than 1, typically greater than 2. In a preferred embodiment, R is a $C_{6-20}$ alkyl.

When the phenol aldehyde resins are derived from two or more phenols which are either unsubstituted or substituted with certain alkyl branches, the phenol aldehydes derived therefrom ("mixed phenol aldehydes") may achieve higher performance levels as asphaltene stabilizers (and in inhibiting the adverse effects of asphaltenes) compared to a phenol aldehyde resin derived from only one phenol.

Exemplary mixed phenol aldehydes include polymers derived from an aldehyde and two or more substituted-monophenol or unsubstituted-monophenol comprising a first phenol which is a $C_{1-20}$ linear or branched alkyl monophenol; and a second phenol which is unsubstituted or a $C_{1-20}$ linear or branched alkyl monophenol different from the first phenol.

In an embodiment, the mixed phenol aldehydes are derived from a $C_{7-20}$ linear or branched alkyl monophenol and a $C_{1-6}$ linear or branched alkyl monophenol. In another embodiment, the mixed phenol aldehydes are derived from a $C_{9-12}$ linear or branched alkyl monophenol and a $C_{1-6}$ linear or branched alkyl monophenol.

In specific exemplary embodiments, the mixed phenol aldehydes are derived from the following combinations of the phenols: a branched 4-dodecyl phenol and para t-butyl phenol; a branched 4-nonyl phenol and para t-butyl phenol; a branched 4-dodecyl phenol and a branched 4-hexyl phenol; or a branched 4-nonyl phenol and a branched 4-hexyl phenol.

In an embodiment, the mixed phenol formaldehydes have the formula:

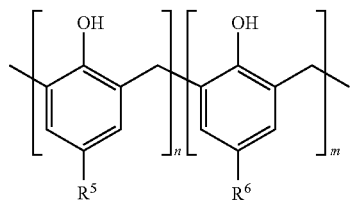

wherein $R^5$ is a $C_{1-20}$ (preferably $C_{7-20}$) linear or branched alkyl, $R^6$ is different from $R^5$ and is H or a linear or branched $C_{1-20}$ (preferably $C_{1-6}$) alkyl, n and m are integers greater than 1. In an embodiment, $R^5$ is a 09-12 linear or branched alkyl and $R^6$ is a $C_{1-6}$ linear or branched alkyl. In a specific exemplary embodiment, $R^5$ is dodecyl and $R^6$ is t-butyl; or $R^5$ is linear or branched dodecyl and $R^6$ is branched hexyl; or $R^5$ is nonyl and $R^6$ is t-butyl; or $R^5$ is dodecyl and $R^6$ is methyl. The value of n:m can vary broadly, for example about 99:1 to about 1:99, about 1:20 to about 20:1, or about 1:10 to about 10:1. In an embodiment, the value of n:m is about 1:5 to about 5:1. In an embodiment, n:m is about 4:1 to about 1:4. Optionally in some embodiments, n:m can be about 3:1 to about 1:3, about 2.8:1 to about 1:2.8, about 2.5:1 to about 1:2.5, about 2.3:1 to about 1:2.3, or about 2:1 to about 1:2.

When the molar ratio of the two or more alkyl substituted monophenols is about 4:1 to about 1:4 (optionally in some embodiments about 2:1 to about 1:2), the mixed phenol aldehydes can exhibit further improved performance in inhibiting the adverse effects of asphaltenes. For example, a mixed phenol aldehyde derived from a first phenol and second phenol having a molar ratio of about 4:1 to about 1:4 (optionally in some embodiments about 2:1 to about 1:2) can provide better asphaltene stabilization and inhibit the adverse effects of asphaltene as compared to a reference phenol aldehyde derived from the first phenol alone, derived from the second phenol alone, or derived from both the first and second phenols but having a molar ratio falling outside of the range of about 4:1 to about 1:4 (optionally in some embodiments about 2:1 to about 1:2).

Using two or more phenols, the mixed phenol aldehydes derived therefrom can achieve longer chain lengths and higher weight average molecular weight than phenol aldehydes prepared by similar means using a single substituted alkyl monophenol. The weight average molecular weight of the mixed phenol aldehydes can be about 5,000 to about 20,000 Daltons or about 6,000 to about 10,000 Daltons, each measured by gel permeation chromatography (GPC), using a crosslinked styrene-divinylbenzene column.

Methods of making the mixed phenol aldehydes include reacting an aldehyde with two or more monophenols as disclosed herein in the presence of an acid catalyst such as a sulfonic acid (e.g. dodecylbenzene sulfonic acid), oxalic acid, or hydrochloric acid. An antifoaming agent can be added if desired. The molar ratio of the aldehyde relative to the sum of the moles of the two or more monophenols is about 0.4:1 to about 1.2:1. The reaction temperature can be about 90° C. to about 140° C. The reaction of the aldehyde with mixed phenols is generally conducted for about 30 minutes to about 4 hours, specifically less than about 3 hours.

Known additives can be added to enhance the performance of the asphaltene inhibitor, such as in reducing asphaltene deposition and accumulation. In an embodiment, improved asphaltene stabilization may result by mixing the phenol aldehyde resin or mixed phenol aldehyde resins with a synergist such as amines and polyamines. In an embodiment, the mixed phenol aldehydes exhibit improved asphaltene stabilization when used together with synergists as compared to the blends of the same synergetic additive with phenol aldehydes formed from a single phenol. Exemplary synergistic additives include fatty acid based imidazoline, diethylenetriamine, tetraethylenetetramine, tetraethylenepentamine, or a combination thereof. In an embodiment, the synergistic additive(s) are used at dosages of about 1 to about 25% of the amount of the phenol aldehydes by weight. In another embodiment, the weight ratio of the mixed phenol aldehyde relative to the synergistic additive is about 99:1 to about 4:1.

The amounts of the ionic liquids and the asphaltene inhibitor can be determined depending on the specific phenol aldehyde resin used, the specific chemistry of the petroleum hydrocarbon fluids as well as the conditions such as pressure and temperature the petroleum hydrocarbon fluids are exposed to during production, refining, and storage.

In an embodiment, the amount of ionic liquid added to the petroleum hydrocarbon fluid is about 1 ppm to about 2,000 ppm, or about 1 ppm to about 500 ppm, or about 5 ppm to about 150 ppm, based on the total volume of the petroleum hydrocarbon fluid. The amount of asphaltene inhibitor added to the petroleum hydrocarbon fluid is about 5 ppm to about 5,000 ppm, or about 10 ppm to about 1,000 ppm, or about 25 ppm to about 500 ppm, based on a total volume of the petroleum hydrocarbon fluid. In the asphaltene inhibitor composition, the amount of the asphaltene inhibitor relative to the ionic liquid based on weight is about 99:1, or about 9:1, or about 3:1. In an embodiment, the asphaltene inhibitor compositions contain about 5 to about 65 wt. % or about 10 to about 50 wt. % of the asphaltene inhibitor and the about 1 to about 15 wt. % or about 1 wt. % to about 7.5 wt. % of the ionic liquid, each based on the total weight of the asphaltene inhibitor compositions.

It is appreciated that both the ionic liquids and the asphaltene inhibitor can be added to the petroleum hydrocarbon fluids in the form of solutions or dispersions. The amounts disclosed herein are based on the volume of the ionic liquids and asphaltene inhibitor themselves, not based on the volume of the ionic liquid/asphaltene inhibitor solutions or dispersions that contain a solvent for the asphaltene inhibitor and/or the ionic liquids.

The ionic liquids and the asphaltene inhibitor can be separately added to the petroleum hydrocarbon fluids. Alternatively, the ionic liquids and the phenol aldehyde resins can be combined first to provide an asphaltene inhibitor composition, and the asphaltene inhibitor composition is contacted with the petroleum hydrocarbon fluids.

In addition to the ionic liquids and the phenolic aldehyde resins, the asphaltene inhibitor compositions can further include other components in the formulations. These components may be included to provide formulations with desirable physical properties or stability characteristics for process injection or storage considerations. Exemplary formulation components include solvents such as aromatic hydrocarbons, aliphatic hydrocarbons, alcohols, ethers, ketones, and aldehydes. The asphaltene inhibitor compositions can be formulated in various forms including, but are not limited to, solutions, dispersions, emulsions, and the like. Depending on the form of the asphaltene inhibitor compositions, additives such as water, surfactants, dispersants, emulsifiers, or a combination thereof may be present.

Other exemplary additives to provide additional benefits include dispersants, corrosion inhibitors, scale inhibitors, paraffin inhibitors, hydrate inhibitors, demulsifiers, sulfide scavengers, or a combination thereof. Any known dispersants, corrosion inhibitors, scale inhibitors, paraffin inhibitors, hydrate inhibitors, demulsifiers, and sulfide scavengers can be used as long as the additives do not adversely affect the asphaltene inhibiting efficiency of the ionic liquid and phenolic aldehyde resin blends.

The amount of the asphaltene inhibitor compositions used to treat petroleum hydrocarbon fluids can vary depending on the concentrations of the ionic liquid and the asphaltene inhibitor in the asphaltene inhibitor composition, the specific chemistry of the petroleum hydrocarbon fluids, as well as the conditions, such as pressure and temperature to which the petroleum hydrocarbon fluids are subjected during production, processing, refining and storage. In an embodiment, about 10 ppm to about 10,000 ppm, or about 50 ppm to about 5,000 ppm, or about 100 ppm to about 1,000 ppm of asphaltene inhibitor compositions are used to treat petroleum hydrocarbon fluids.

EXAMPLES

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

One method to evaluate asphaltene inhibitors is through measurement of asphaltene stability using the method described in U.S. Pat. No. 9,360,425 also referred to as the Analytical Centrifuge Stability Analysis for Asphaltenes (ACSAA). ACSAA couples use of an analytical centrifuge with a destabilization solvent addition process to a petroleum hydrocarbon fluid that allows a quantitative determination of the relative instability of asphaltenes in the particular hydrocarbon fluid. As such, the influence of asphaltene inhibitors at decreasing the relative instability of asphaltene in the hydrocarbon fluid can be measured with the ACSAA method and subsequently used to compare the relative performance of asphaltene inhibitors amongst each other.

The instability measurement calculated in the ACSAA method is termed the Instability Index. It is a normalized value of the instability of a sample ranging from 0 to 1. The value zero indicates no instability (no change or completely stable during the test) and the value 1 is the maximum change or instability.

Asphaltene inhibitors that provide the greatest decrease in instability index, over untreated or reference samples, are judged the better performing inhibitor chemistries or products. In the examples shown below, the percent improvement (or percent decrease) in instability index is given in tables and plotted for various crude oil treated with the ionic liquid/phenol aldehyde blends of the disclosure and, for comparison in the control examples, various crude oils treated with phenol aldehydes without additives and with phenol aldehydes blends with current industry applied amines and polyamines.

ACSAA testing can be performed at various temperatures. In performing testing at higher temperatures, the petroleum hydrocarbon fluid, destabilizing solvent, and centrifuge tubes are all pre-heated before mixing the hydrocarbon fluid and destabilizing solvent. Afterwards these are mixed and then immediately placed and run in the analytical centrifuge maintained at test temperature. The analytical centrifuge used in the work below has a maximum operating temperature of 60° C. However, the effect of slightly higher temperatures can be obtained by heating samples (hydrocarbon fluid, destabilizing solvent, centrifuge tubes, etc.) at higher temperature, mixing the hydrocarbon fluid and solvent, and then running in the centrifuge at 60° C. For example, some data below is reported as pseudo 80° C. In these experiments samples were heated to 90° C. in an oven, immediately mixed after removing from the oven and then run in the analytical centrifuge at 60° C.

Examples 1-6

Examples 1-6 show the effect of different ionic liquids as synergists in improving the performance of a phenol aldehyde resin #1 asphaltene inhibitor derived from a single substituted monophenol as disclosed herein on the improvement in instability index over untreated crude oil (blank) in ACSAA testing at 25° C. for Crude oil #1. Also shown is the result using an industry applied polyamine additive. Formulations and results are summarized in Table 1. The results are also illustrated graphically in FIG. 1.

TABLE 1

| | Unit | CEx 1 | CEx 2 | Ex 3 | Ex 4 | Ex 5 | Ex 6 |
|---|---|---|---|---|---|---|---|
| Component | | | | | | | |
| Phenol aldehyde Resin #1 | ppm | 100 | 100 | 100 | 100 | 100 | 100 |
| Polyamine | ppm | | 200 | | | | |
| Dicocodimethyl ammonium hydroxide | ppm | | | 200 | | | |
| Ditallowdimethyl ammonium hydroxide | ppm | | | | 200 | | |
| Tributylmethylammonium methyl carbonate | ppm | | | | | 200 | |
| Tetraethylammonium bicarbonate | ppm | | | | | | 200 |
| Performance | | | | | | | |
| Improvement over blank | % | 58.5 | 65.1 | 69.4 | 62.7 | 79.2 | 76.0 |

1. The phenol aldehyde Resin #1 added was a 40 wt. % solution.
2. The ionic liquids and polyamine added were 5 wt. % solutions.

As seen in Table 1 and FIG. 1, each of the ionic liquids tested (Ex 3-Ex 6), when used together with phenol aldehyde resin #1, provides some improvement over the performance of phenol aldehyde resin #1 without synergist (CEx 1). Further the dicocodimethyl ammonium hydroxide (Ex 3), tributylmethylammonium methyl carbonate (Ex 5), and tetraethylammonium bicarbonate (Ex 6) perform better than the polyamine additive (CEx 2).

Examples 7-11

Figure 2:
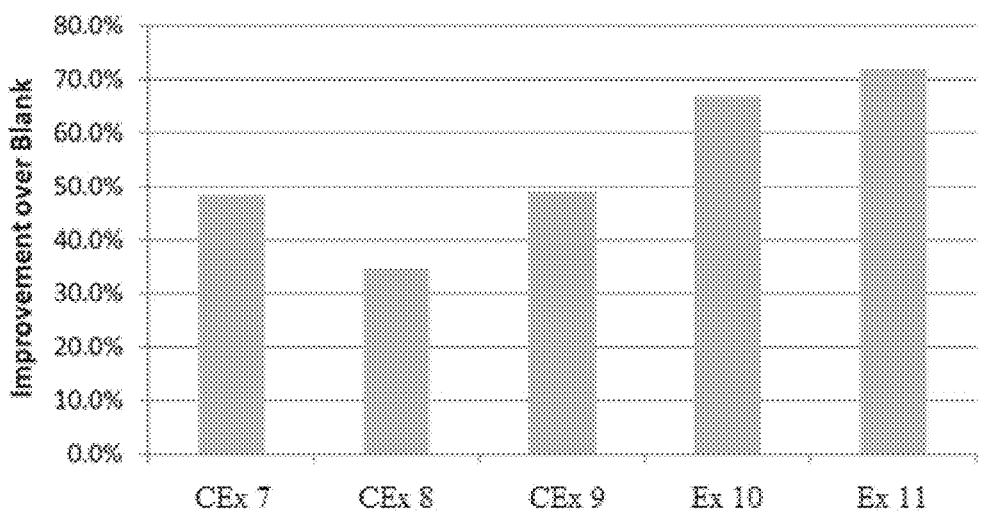
FIG. 2 shows ACSAA test results at 25° C. on Crude Oil #1 treated with phenol aldehyde resin asphaltene inhibitor #2 alone or in combination with an amine, a polyamine additive, or two ionic liquid synergists.

Examples 7-11 show the effect of two different ionic liquids (dicocodimethyl ammonium hydroxide and ditallowdimethyl ammonium hydroxide) as synergists in improving the performance of phenol aldehyde resin #2 asphaltene inhibitor derived from two alkyl-substituted monophenols as disclosed herein on the improvement in instability index over untreated crude oil (blank) in ACSAA testing at 25° C. for Crude oil #1. Also shown are results using industry applied polyamine and amine additives. Formulations and results are summarized in Table 2. The results are also illustrated graphically in FIG. 2.

TABLE 2

| | Unit | CEx 7 | CEx 8 | CEx 9 | Ex 10 | Ex 11 |
|---|---|---|---|---|---|---|
| Component | | | | | | |
| Phenol aldehyde resin#2 | ppm | 100 | 100 | 100 | 100 | 100 |
| Amine | ppm | | 200 | | | |
| Polyamine | ppm | | | 200 | | |
| Dicocodimethyl ammonium hydroxide | ppm | | | | 200 | |
| Ditallowdimethyl ammonium hydroxide | ppm | | | | | 200 |
| Performance | | | | | | |
| Improvement over blank | % | 48.4 | 34.6 | 49.0 | 66.8 | 71.9 |

[1.] The phenol aldehyde resin #2 added was a 40 wt. % solution.
[2.] The ionic liquids, amine, and polyamine added were 5 wt. % solutions.

The results indicate that the amine has an adverse effect on the performance of phenol aldehyde resin #2 for this crude oil. Without any additive, the phenol aldehyde resin #2 has about 48.4% improvement over untreated oil (CEx 7). However, when the amine is used together with the phenol aldehyde resin #2, the improvement over untreated oil decreases to 34.6% (CEx 8). The polyamine does not have much effect on the performance of the phenol aldehyde resin #2 as the improvement over untreated oil when the polyamine is used is 49% (CEx 9) whereas the improvement over untreated oil when no synergist is used is 48% (CEx 7). In contrast, when an ionic liquid as disclosed herein is used, the performance of phenol aldehyde resin #2 is significantly increased from 48.4% (CEx 7) to 66.8% (Ex 10) and 71.9% (Ex 11). The two ionic liquids tested (Ex 10 and Ex 11) also perform much better than the amine and the polyamine additives (CEx 8 and CEx 9).

Examples 12-19

Examples 12-19 show the effect of different ionic liquids as synergists in improving the performance of phenol aldehyde resin #3 asphaltene inhibitor derived from a single substituted monophenol different from the one used to make phenol aldehyde resin #1 on the improvement in instability index over untreated crude oil in ACSAA testing at 25° C. for Crude oil #2. Also shown are results using an industry applied amine additive. Formulations and results are summarized in Table 3. The results are also illustrated graphically in FIG. 3.

TABLE 3

| | Unit | CEx 12 | CEx 13 | Ex 14 | Ex 15 | Ex 16 | Ex 17 | Ex 18 | Ex 19 |
|---|---|---|---|---|---|---|---|---|---|
| Component | | | | | | | | | |
| Phenol aldehyde resin#3 | Ppm | 100 | 100 | 100 | 100 | 100 | 100 | 100 | 100 |
| Amine | Ppm | | 150 | | | | | | |
| Tributylmethylammonium methyl carbonate | Ppm | | | 150 | | | | | |
| Tetrabutyl ammonium hydroxide | ppm | | | | 150 | | | | |
| Tetraethyl ammonium bicarbonate | ppm | | | | | 150 | | | |
| Dicocodimethyl ammonium hydroxide | ppm | | | | | | 150 | | |
| Ditallowdimethyl ammonium hydroxide | ppm | | | | | | | 150 | |
| Oxydiethylene bis(cocodimethylammonium hydroxide) | ppm | | | | | | | | 150 |
| Performance | | | | | | | | | |
| Improvement over blank | % | 23.6 | 36.4 | 27.7 | 24.4 | 25.6 | 48.5 | 49.3 | 26.5 |

[1.] The phenol aldehyde resin #3 added was a 40 wt. % solution.
[2.] The ionic liquids and amine added were 5 wt. % solutions.

Figure 3:
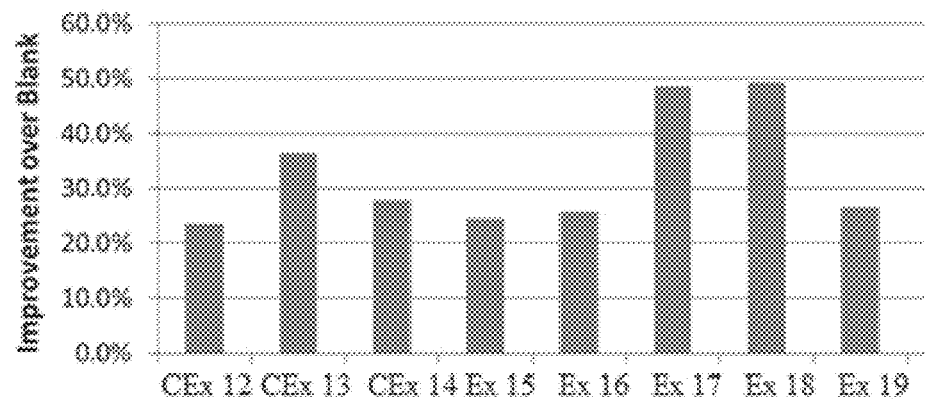
FIG. 3 shows ACSAA test results at 25° C. on Crude Oil #2 treated with phenol aldehyde resin asphaltene inhibitor #3 alone or in combination with an amine or several ionic liquid synergists.

As seen in Table 3 and FIG. 3, each of the ionic liquids tested (Ex 14-Ex 19), when used together with phenol aldehyde resin #3, provides some improvement over the performance of phenol aldehyde resin #3 without synergist (CEx 12). Further the dicocodimethyl ammonium hydroxide (Ex 17) and ditallowdimethyl ammonium hydroxide (Ex 18) perform better than the amine additive (CEx 13).

Examples 20-26

Examples 20-26 show the effect of different ionic liquids as synergists in improving the performance of phenol aldehyde resin #3 asphaltene inhibitor on the improvement in instability index over untreated crude oil in ACSAA testing at 25° C. for Crude oil #3. Formulations and results are summarized in Table 4. The results are also illustrated graphically in FIG. 4.

TABLE 4

| | Unit | CEx 20 | Ex 21 | Ex 22 | Ex 23 | Ex 24 | Ex 25 | Ex 26 |
|---|---|---|---|---|---|---|---|---|
| Component | | | | | | | | |
| Phenol aldehyde resin#3 | Ppm | 400 | 400 | 400 | 400 | 400 | 400 | 400 |
| Tributylmethylammonium methyl carbonate | Ppm | | 400 | | | | | |
| Tetrabutyl ammonium hydroxide | Ppm | | | 400 | | | | |
| Tetraethyl ammonium bicarbonate | Ppm | | | | 400 | | | |
| Dicocodimethyl ammonium hydroxide | Ppm | | | | | 400 | | |
| Ditallowdimethyl ammonium hydroxide | Ppm | | | | | | 400 | |
| Oxydiethylene bis(coco-dimethylammonium hydroxide) | Ppm | | | | | | | 400 |
| Performance | | | | | | | | |
| Improvement over blank | % | 18.7 | 63.7 | 56.0 | 50.0 | 65.1 | 72.0 | 41.2 |

[1.] The phenol aldehyde resin #3 added was a 40 wt. % solution.
[2.] The ionic liquids added were 5 wt. % solutions.

Figure 4:
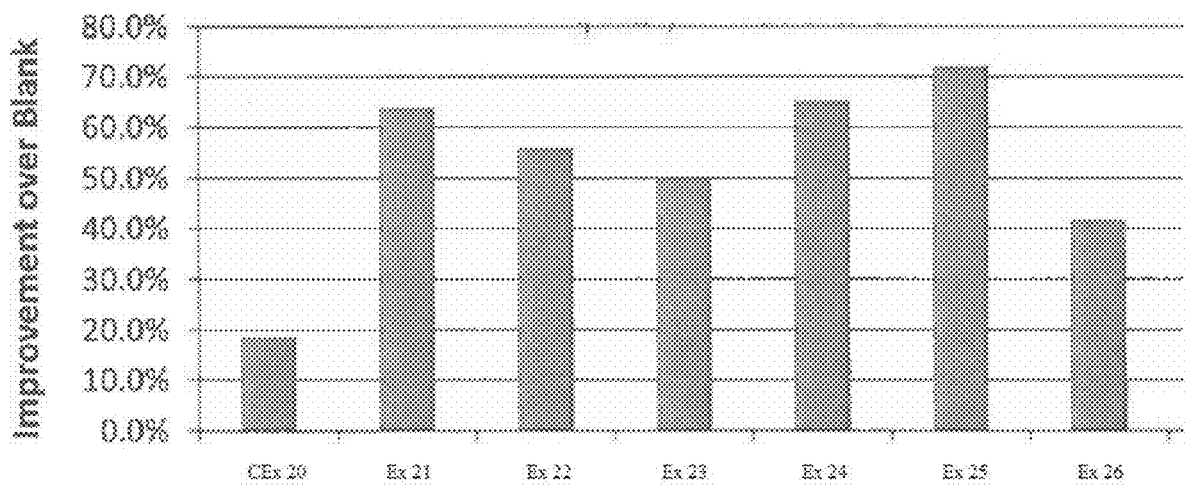
FIG. 4 shows ACSAA test results at 25° C. on Crude Oil #3 treated with phenol aldehyde resin asphaltene inhibitor #3 alone or in combination with an amine or several ionic liquid synergists.

As seen in Table 4 and FIG. 4, each of the tested ionic liquids (Ex 21-Ex 26), when used together with phenol aldehyde resin #3, provides significant improvement over the performance of the phenol aldehyde resin #3 without synergist (CEx 20).

Examples 27-30

Figure 5:
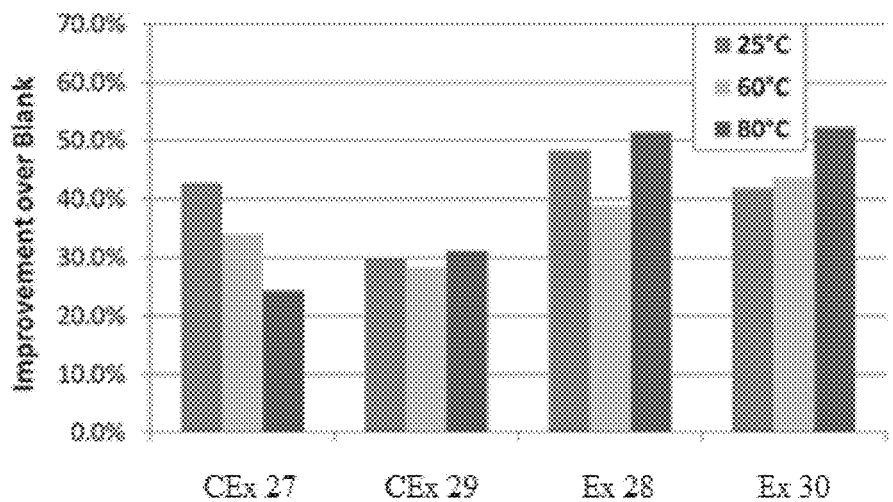
FIG. 5 shows ACSAA test results at 25, 60, and pseudo 80° C. on Crude Oil #4 treated with phenol aldehyde resin asphaltene inhibitors #2 and #4 alone or in combination with an amine or ditallowdimethyl ammonium hydroxide ionic liquid synergist.

Examples 27-30 show the effect of the ionic liquid ditallowdimethyl ammonium hydroxide as a synergist and an industry applied amine additive in improving the performance of phenol aldehyde resins #2 asphaltene inhibitor and phenol aldehyde resin #4 asphaltene inhibitor, which is derived from the same two alkyl-substituted monophenols used to make phenol aldehyde resin #2 but with different monophenol ratios, on the improvement in instability index over untreated crude oil in ACSAA testing at 25, 60, and pseudo 80° C. for Crude oil #4. Formulations and results are summarized in Tables 5A and 5B. The results are also illustrated graphically in FIG. 5.

TABLE 5A

| Component | Unit | CEx 27 | Ex 28 |
|---|---|---|---|
| Phenol aldehyde resin #2 | ppm | 1000 | 1000 |
| Amine | ppm | 750 | |
| Ditallowdimethyl ammonium hydroxide | ppm | | 750 |
| Performance | | | |
| Improvement over blank (25° C.) | % | 42.6 | 48.2 |
| Improvement over blank (60° C.) | % | 34.0 | 38.8 |
| Improvement over blank (80° C.) | % | 24.4 | 51.3 |

[1.] The phenol aldehyde resin #2 used was a 40 wt. % solution.
[2.] The ionic liquids and the amine were 10 wt. % solutions.

TABLE 5B

| Component | Unit | CEx 29 | Ex 30 |
|---|---|---|---|
| Phenol aldehyde resin #4 | ppm | 1000 | 1000 |
| Amine | ppm | 750 | |
| Ditallowdimethyl ammonium hydroxide | ppm | | 750 |
| Performance | | | |
| Improvement over blank (25° C.) | % | 30.0 | 41.8 |
| Improvement over blank (60° C.) | % | 28.2 | 43.6 |
| Improvement over blank (80° C.) | % | 31.1 | 52.3 |

[1.] The phenol aldehyde resin #4 used was a 40 wt. % solution.
[2.] The ionic liquids and amine were 10 wt. % solutions.

The results indicate that the ditallowdimethyl ammonium hydroxide (Ex 28 and Ex 30) provides better performance than the amine additive for both phenol aldehyde resin #2 and phenol aldehyde resin #4 (CEx 27 and CEx 29) at all the testing temperatures of 25, 60, and pseudo 80° C. The improvement is more pronounced at higher temperatures. When the amine additive is used, the improvement of phenol aldehyde resin #2 over untreated oil is 24.4% when tested at 80° C. (CEx 27). In contrast, when ditallowdimethyl ammonium hydroxide is used at the same loading level, the improvement of phenol aldehyde resin #2 over untreated oil has increased to 51.3% when tested at 80° C. (Ex 28), more than double the improvement provided by the amine additive. Similarly, comparing CEx 29 with Ex 30, when the amine additive is used, the improvement of phenol aldehyde resin #4 over untreated oil is 31.1% when tested at 80° C. whereas when ditallowdimethyl ammonium hydroxide is used at the same loading level, the improvement of phenol aldehyde resin #4 over untreated oil has increased to 52.3% when tested at 80° C.

Examples 31-33

Examples 31-33 show the effect of the ionic liquids dicocodimethyl ammonium hydroxide and ditallowdimethyl ammonium hydroxide as synergists in improving the performance of the phenol aldehyde resin #2 asphaltene inhibitor on the improvement in instability index over untreated crude oil in ACSAA testing at 25, 60, and pseudo 80° C. for Crude oil #4. Formulations and results are summarized in Table 6. The results are also illustrated graphically in FIG. 6.

TABLE 6

| Component | Unit | CEx 31 | Ex 32 | Ex 33 |
|---|---|---|---|---|
| Phenol aldehyde resin #2 | ppm | 1000 | 1000 | 1000 |
| Dicocodimethyl ammonium hydroxide | ppm | | 1000 | |
| Ditallowdimethyl ammonium hydroxide | ppm | | | 1000 |
| Performance | | | | |
| Improvement over blank (25° C.) | % | 0.7 | 38.3 | 37.3 |
| Improvement over blank (60° C.) | % | 10.6 | 33.5 | 34.0 |
| Improvement over blank (80° C.) | % | 10.9 | 35.8 | 36.3 |

[1.] The phenol aldehyde resin #2 used was a 40 wt. % solution.
[2.] The ionic liquids were 10 wt. % solutions.

Figure 6:
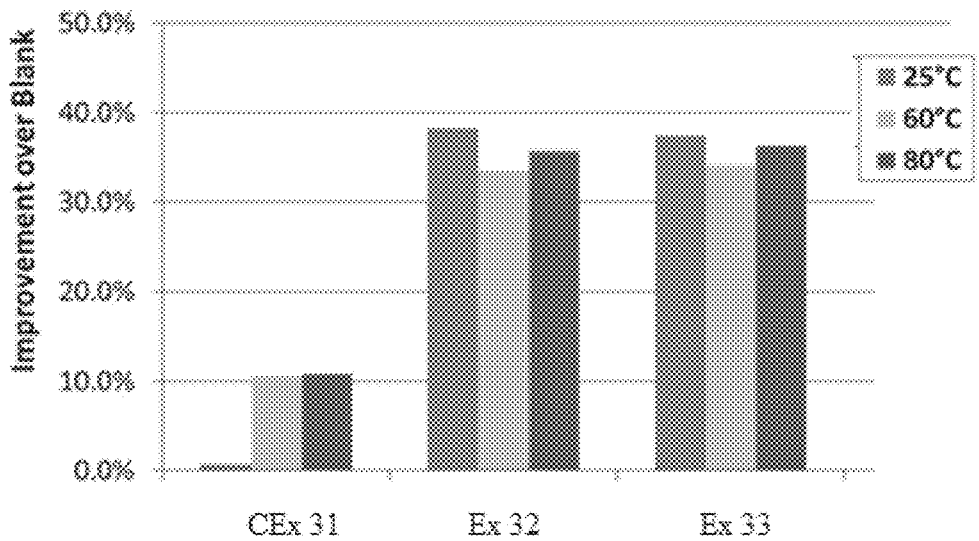
FIG. 6 shows ACSAA test results at 25, 60, and pseudo 80° C. on Crude Oil #4 treated with phenol aldehyde resin asphaltene inhibitor #2 alone or in combination with different ionic liquid synergists.

As seen in Table 6 and FIG. 6, each of the ionic liquids tested (Ex 32 and Ex 33), when used together with the phenol aldehyde resin #2, improves performance of phenol aldehyde resin #2 without a synergist (CEx 31) at all the testing temperatures of 25, 60, and 80° C.

Examples 34-37

Examples 34-37 show the effect of the ionic liquids dicocodimethyl ammonium hydroxide and ditallowdimethyl ammonium hydroxide as synergists in improving the performance of phenol aldehyde resin #2 asphaltene inhibitors on the improvement in instability index over untreated crude oil in ACSAA testing at 25, 60, and pseudo 80° C. for Crude oil #4. Also shown are results using industry applied amine additive.

TABLE 7

| Component | Unit | CEx 34 | CEx 35 | Ex 36 | Ex 37 |
|---|---|---|---|---|---|
| Phenol aldehyde resin#2 | ppm | 1000 | 1000 | 1000 | 1000 |
| Amine | ppm | | 1000 | | |
| Dicocodimethyl ammonium hydroxide | ppm | | | 1000 | |
| Ditallowdimethyl ammonium hydroxide | ppm | | | | 1000 |

TABLE 7-continued

| Component | Unit | CEx 34 | CEx 35 | Ex 36 | Ex 37 |
|---|---|---|---|---|---|
| Performance | | | | | |
| Improvement over blank (25° C.) | % | 0.7 | 62.4 | 38.3 | 37.5 |
| Improvement over blank (60° C.) | % | 10.6 | 27.1 | 33.5 | 34.0 |
| Improvement over blank (80° C.) | % | 10.9 | 14.5 | 35.8 | 36.3 |

[1.] The phenol aldehyde resin #2 used was a 40 wt. % solution.
[2.] The ionic liquids and amine were 10 wt. % solutions.

Figure 7:
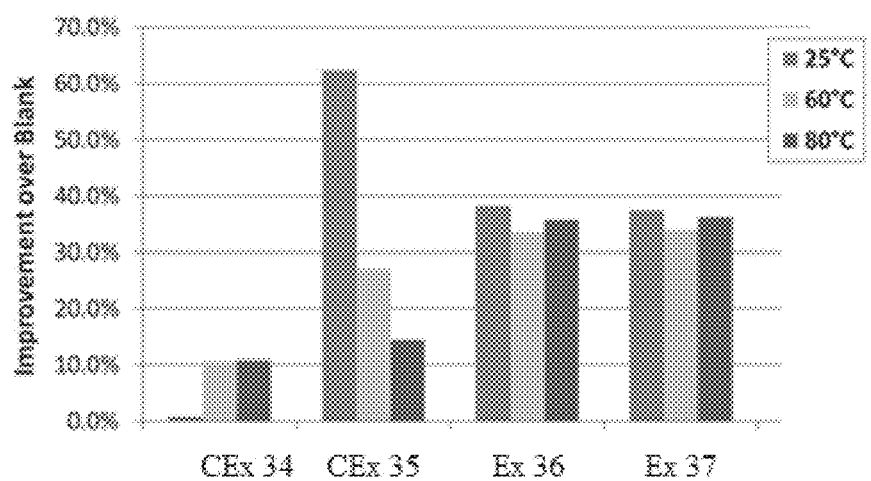
FIG. 7 shows ACSAA test results at 25, 60, and pseudo 80° C. on Crude Oil #4 treated with phenol aldehyde resin asphaltene inhibitor #2 alone or in combination with an amine or different ionic liquid synergists.

As seen in Table 7 and FIG. 7, each of the tested ionic liquids (Ex 36-Ex 37), when used together with phenol aldehyde resin #2, improves performance of phenol aldehyde resin #2 without synergist (CEx 34). At 25° C., the ionic liquids dicocodimethyl ammonium hydroxide and ditallowdimethyl ammonium hydroxide (Ex 36-Ex 37) are not better than the amine synergist (CEx 35). However, at the higher temperatures each is significantly better than the amine additive.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

Embodiment 1

A method of enhancing the performance of an asphaltene inhibitor during production, storage, transportation or refining of a petroleum hydrocarbon fluid, the method comprising contacting the asphaltene inhibitor with an ionic liquid during a production or refining operation or prior to or during storage or transportation of the petroleum hydrocarbon fluid, wherein the ionic liquid has a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene or a polyoxyalkylene group or a zwitterion; $R^8$ is a straight or branched $C_{1-30}$ alkylene, an alkylene oxyalkylene or an alkylene polyoxyalkylene; and the anion includes halides, hydroxyl, bicarbonate, carbonate, alkyl carbonates, alkoxides, carboxylates, hydroxycarboxylates or a combination thereof.

Embodiment 2

The method of embodiment 1, wherein at least one of $R^1$, $R^2$, $R^3$, $R^4$, $R^5$, $R^6$ and $R^7$ is —H or a $C_{1-20}$ alkyl.

Embodiment 3

The method of embodiment 2, wherein at least one of $R^1$, $R^2$, $R^3$, $R^4$, $R^5$, $R^6$ and $R^7$ is a $C_{6-20}$ alkyl.

Embodiment 4

The method of embodiment 3, wherein at least one of $R^1$, $R^2$, $R^3$, $R^4$, $R^5$, $R^6$ and $R^7$ is a $C_{6-12}$ alkyl.

Embodiment 5

The method of any of embodiments 2 to 4, wherein at least two of $R^1$, $R^2$, $R^3$, $R^4$, $R^5$, $R^6$ and $R^7$ are a $C_{2-20}$ alkyl.

Embodiment 6

The method of embodiment 5, wherein at least two of $R^1$, $R^2$, $R^3$, $R^4$, $R^5$, $R^6$ and $R^7$ are independently a $C_{6-20}$ alkyl.

Embodiment 7

The method of any of embodiments 1 to 6, wherein the polyoxyalkylene group is of the formula H—[O—$R^{10}$-]$_z$, where each occurrence of $R^{10}$ is independently a $C_{1-10}$ alkylene and z is an integer greater than 1.

Embodiment 8

The method of embodiment 7, wherein the $C_{1-10}$ alkylene is ethylene, propylene, butylene, or a combination thereof.

Embodiment 9

The method of embodiment 7 or 8, wherein z is from 2 to 30.

Embodiment 10

The method of any of embodiments 1 to 6, wherein the alkylene polyoxyalkylene group is of the formula —$R^{12}$—[O—$R^{13}$-]$_y$, wherein $R^{12}$ is a $C_{1-30}$ alkylene, each occurrence of $R^{13}$ is independently a $C_{1-10}$ alkylene, and y is an integer from 1 to 500.

Embodiment 11

The method of embodiment 10, wherein the $C_{1-10}$ alkylene is ethylene, propylene, butylene, or a combination thereof.

Embodiment 12

The method of any of embodiments 1 to 6, wherein the alkylene oxyalkylene group is of the formula —$R^{14}$—O—$R^{15}$—, wherein $R^{14}$ and $R^{15}$ are each independently a $C_{1-20}$, branched or straight chain alkylene.

Embodiment 13

The method of any of embodiments 1 to 12, wherein the anion is a hydroxide.

Embodiment 14

The method of any of embodiments 1 to 12, wherein the anion is a carbonate or bicarbonate.

Embodiment 15

The method of embodiment 14, wherein the anion is an alkyl carbonate of the formula $ROCO_2^-$, where R is a halogenated or non-halogenated linear or branched alkyl, or hydroxyl alkyl group.

Embodiment 16

The method of embodiment 15, wherein the anion is an alkyl carbonate selected from the group consisting of methyl, ethyl, propyl, butyl, 2-ethylhexyl, octyl, ethylene and propylene carbonate.

Embodiment 17

The method of any of embodiments 1 to 12, wherein the anion is a carboxylate, hydroxycarboxylate or a $C_{18}$ fatty acid or a combination thereof.

Embodiment 18

The method of embodiment 17, wherein the anion is selected from the group consisting of formate, acetate, propionate, benzoate, n-butyrate, isobutyrate, pivalate, octanoate, laurate, glycolate, lactate, citrate, glucarate, gluconate, oleate, linoleate and stearate or a combination thereof.

Embodiment 19

The method of any of embodiments 1 to 12, wherein the anion is an alkoxide.

Embodiment 20

The method of embodiment 19, wherein the alkoxide is of the formula RO— where R is a $C_{1-30}$ alkyl or cycloalkyl group.

Embodiment 21

The method of embodiment 20, wherein, R is a $C_{1-18}$ alkyl, $C_{6-12}$ aryl, or $C_{5-12}$ cycloalkyl.

Embodiment 22

The method of embodiment 21, wherein the anion is an alkoxide selected from the group consisting of tert-butoxide, n-butoxide, isopropoxide, n-propoxide, isobutoxide, ethoxide, methoxide, n-pentoxide, isopentoxide, 2-ethylhexoxide, 2-propylheptoxide, nonoxide, octoxide, decoxide and isomers thereof or a combination thereof.

Embodiment 23

The method of embodiment 19, wherein the alkoxide is an ethylene or propylene oxide homopolymer, copolymer or terpolymer, which is optionally crosslinked.

Embodiment 24

The method of embodiment 1, wherein the ionic liquid comprises dicocodimethyl ammonium hydroxide, ditallowdimethyl ammonium hydroxide, tributylmethylammonium methyl carbonate, tetraethylammonium bicarbonate, tetrabutylammonium hydroxide, tallowtrimethyl ammonium hydroxide, cocotrimethyl ammonium hydroxide, hydrogenated tallow trimethyl ammonium hydroxide, dihydrogenated tallow dimethyl ammonium hydroxide, oxydiethylene bis(cocodimethylammonium hydroxide), or a combination thereof.

Embodiment 25

The method of any of embodiments 1 to 24, wherein the weight ratio of the asphaltene inhibitor relative to the ionic liquid is about 99:1 to about 3:1.

Embodiment 26

The method of any of embodiments 1 to 25, wherein the asphaltene inhibitor is selected from the group consisting of fatty ester homopolymers, fatty ester copolymers, sorbitan monooleate, phenolic resins, alkoxylated fatty amines, fatty amine derivatives or a combination thereof.

Embodiment 27

The method of embodiment 25 or 26, wherein the asphaltene inhibitor is combined with an organic metal salt.

Embodiment 28

The method of embodiment 26, wherein the asphaltene inhibitor is a phenol aldehyde resin.

Embodiment 29

The method of embodiment 28, wherein the asphaltene inhibitor further contains an amine or polyamine additive.

Embodiment 30

The method of embodiment 29, wherein the amine or polyamine additive is selected from the group consisting of fatty acid based imidazolines, diethylenetriamine, tetraethylenetetramine, tetraethylenepentamine, or a combination thereof.

Embodiment 31

The method of any of embodiments 28 to 30, wherein the phenol aldehyde resin is derived from an alkyl-substituted monophenol or unsubstituted monophenol or a combination thereof and an aldehyde.

Embodiment 32

The method of embodiment 31, wherein the alkyl-substituted monophenol has a branched or linear $C_{1-20}$ alkyl substituent or a combination thereof, and the aldehyde comprises formaldehyde, paraformaldehyde, acetaldehyde, propionaldehyde, butyraldehyde, glyoxal, glutaraldehyde, 1,9-nonanedial, or a combination thereof

Embodiment 33

The method of any of embodiments 28 to 30, wherein the phenol aldehyde resin is of the structure:

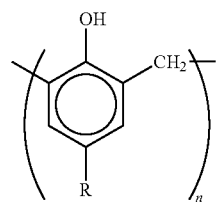

wherein R is —H or a $C_{1-20}$ linear or branched alkyl and n is greater than 2.

Embodiment 34

The method of embodiment 33, wherein at least one R is a $C_{6-20}$ alkyl.

Embodiment 35

The method of any of embodiments 28 to 30, wherein the phenol aldehyde resin has a structure represented by the formula:

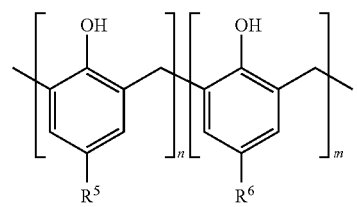

wherein $R^5$ is a $C_{1-20}$ linear or branched alkyl, $R^6$ is different from $R^5$ and is H or a linear or branched $C_{1-20}$ alkyl, and n and m are greater than 1.

Embodiment 36

The method of embodiment 35, wherein $R^5$ is a $C_{7-16}$ linear or branched alkyl and $R^6$ is a $C_{1-6}$ linear or branched alkyl.

Embodiment 37

The method of any of embodiments 1 to 36, wherein the ionic liquid and the asphaltene inhibitor form a complex.

Embodiment 38

The method of any of embodiments 1 to 36, wherein the ionic liquid and the asphaltene inhibitor form a synergistic mixture.

Embodiment 39

The method of embodiment 37 or 38, wherein the weight ratio of the asphaltene inhibitor to the ionic liquid in the complex or synergistic mixture is about 5:95 to about 3:1.

Embodiment 40

The method of any of embodiments 1 to 36, wherein the ionic liquid and the asphaltene inhibitor form a reaction product.

Embodiment 41

The method of embodiment 40, wherein the reaction product is formed from the reaction of the asphaltene inhibitor and the ionic liquid in a 5:95 to about 3:1 weight ratio.

Embodiment 42

An asphaltene inhibitor composition comprising an asphaltene inhibitor and an ionic liquid having a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene or a polyoxyalkylene group or a zwitterion; $R^8$ is a straight or branched $C_{1-30}$ alkylene, an alkylene oxyalkylene or an alkylene polyoxyalkylene; and the anion includes halides, hydroxyl, bicarbonate, carbonate, alkyl carbonates, alkoxides, carboxylates, hydroxycarboxylates or a combination thereof.

Embodiment 43

The asphaltene inhibitor composition of embodiment 42, wherein at least one of $R^1$, $R^2$, $R^3$, $R^4$, $R^5$, $R^6$ and $R^7$ is —H or a $C_{1-20}$ alkyl.

Embodiment 44

The asphaltene inhibitor composition of embodiment 43, wherein at least one of $R^1$, $R^2$, $R^3$, $R^4$, $R^5$, $R^6$ and $R^7$ is a $C_{6-20}$ alkyl.

Embodiment 45

The asphaltene inhibitor composition of embodiment 44, wherein at least one of $R^1$, $R^2$, $R^3$, $R^4$, $R^5$, $R^6$ and $R^7$ is a $C_{6-12}$ alkyl.

Embodiment 46

The asphaltene inhibitor composition of any of embodiments 43 to 45, wherein at least two of $R^1$, $R^2$, $R^3$, $R^4$, $R^5$, $R^6$ and $R^7$ are a $C_{2-20}$ alkyl.

Embodiment 47

The asphaltene inhibitor composition of embodiment 46, wherein at least two of $R^1$, $R^2$, $R^3$, $R^4$, $R^5$, $R^6$ and $R^7$ are independently a $C_{6-20}$ alkyl.

Embodiment 48

The asphaltene inhibitor composition of any of embodiments 42 to 47, wherein the polyoxyalkylene group is of the formula $H—[O—R^{10}-]_z$, where each occurrence of $R^{10}$ is independently a $C_{1-10}$ alkylene and z is an integer greater than 1.

Embodiment 49

The asphaltene inhibitor composition of embodiment 48, wherein the $C_{1-10}$ alkylene is ethylene, propylene, butylene, or a combination thereof.

Embodiment 50

The asphaltene inhibitor composition of embodiment 48 or 49, wherein z is from 2 to 30.

Embodiment 51

The asphaltene inhibitor composition of any of embodiments 42 to 47, wherein the alkylene polyoxyalkylene group is of the formula $—R^{12}—[O—R^{13}-]_y$, wherein $R^{12}$ is a $C_{1-30}$ alkylene, each occurrence of $R^{13}$ is independently a $C_{1-10}$ alkylene, and y is an integer from 1 to 500.

Embodiment 52

The asphaltene inhibitor composition of embodiment 51, wherein the $C_{1-10}$ alkylene is ethylene, propylene, butylene, or a combination thereof.

Embodiment 53

The asphaltene inhibitor composition of any of embodiments 42 to 47, wherein the alkylene oxyalkylene group is of the formula $—R^{14}—O—R^{15}—$, wherein $R^{14}$ and $R^{15}$ are each independently a $C_{1-20}$, branched or straight chain alkylene.

Embodiment 54

The asphaltene inhibitor composition of any of embodiments 42 to 53, wherein the anion is a hydroxide.

Embodiment 55

The asphaltene inhibitor composition of any of embodiments 42 to 53, wherein the anion is a carbonate or bicarbonate.

Embodiment 56

The asphaltene inhibitor composition of embodiment 55, wherein the anion is an alkyl carbonate of the formula $ROCO_2^-$, where R is a halogenated or non-halogenated linear or branched alkyl, or hydroxyl alkyl group.

Embodiment 57

The asphaltene inhibitor composition of embodiment 56, wherein the anion is an alkyl carbonate selected from the group consisting of methyl, ethyl, propyl, butyl, 2-ethylhexyl, octyl, ethylene and propylene carbonate.

Embodiment 58

The asphaltene inhibitor composition of any of embodiments 42 to 53, wherein the anion is a carboxylate, hydroxycarboxylate or a $C_{18}$ fatty acid or a combination thereof.

Embodiment 59

The asphaltene inhibitor composition of embodiment 58, wherein the anion is selected from the group consisting of formate, acetate, propionate, benzoate, n-butyrate, isobutyrate, pivalate, octanoate, laurate, glycolate, lactate, citrate, glucarate, gluconate, oleate, linoleate and stearate or a combination thereof.

Embodiment 60

The asphaltene inhibitor composition of any of embodiments 42 to 53, wherein the anion is an alkoxide.

Embodiment 61

The asphaltene inhibitor composition of embodiment 60, wherein the alkoxide is of the formula RO— where R is a $C_{1-30}$ alkyl or cycloalkyl group.

Embodiment 62

The asphaltene inhibitor composition of embodiment 61, wherein, R is a $C_{1-18}$ alkyl, $C_{6-12}$ aryl, or $C_{5-12}$ cycloalkyl.

Embodiment 63

The asphaltene inhibitor composition of embodiment 62, wherein the anion is an alkoxide selected from the group consisting of tert-butoxide, n-butoxide, isopropoxide, n-propoxide, isobutoxide, ethoxide, methoxide, n-pentoxide, isopentoxide, 2-ethylhexoxide, 2-propylheptoxide, nonoxide, octoxide, decoxide and isomers thereof or a combination thereof.

Embodiment 64

The asphaltene inhibitor composition of embodiment 60, wherein the alkoxide is an ethylene or propylene oxide homopolymer, copolymer or terpolymer, which is optionally crosslinked.

Embodiment 65

The asphaltene inhibitor composition of embodiment 42, wherein the ionic liquid comprises dicocodimethyl ammonium hydroxide, ditallowdimethyl ammonium hydroxide, tributylmethylammonium methyl carbonate, tetraethylammonium bicarbonate, tetrabutylammonium hydroxide, tallowtrimethyl ammonium hydroxide, cocotrimethyl ammonium hydroxide, hydrogenated tallow trimethyl ammonium hydroxide, dihydrogenated tallow dimethyl ammonium hydroxide, oxydiethylene bis(cocodimethylammonium hydroxide), or a combination thereof.

Embodiment 66

The asphaltene inhibitor composition of any of embodiments 42 to 65, wherein the weight ratio of the asphaltene inhibitor relative to the ionic liquid is about 99:1 to about 3:1.

Embodiment 67

The asphaltene inhibitor composition of any of embodiments 42 to 66, wherein the asphaltene inhibitor is selected from the group consisting of fatty ester homopolymers, fatty ester copolymers, sorbitan monooleate, a phenolic resin, an alkoxylated fatty amine, a fatty amine derivative.

Embodiment 68

The asphaltene inhibitor composition of embodiment 67, wherein the asphaltene inhibitor is optionally combined with an organic metal salt.

Embodiment 69

The asphaltene inhibitor composition of embodiment 67, wherein the asphaltene inhibitor is a phenol aldehyde resin.

Embodiment 70

The asphaltene inhibitor composition of embodiment 69, wherein the asphaltene inhibitor further contains an amine or polyamine additive.

Embodiment 71

The method of embodiment 70, wherein the amine or polyamine additive is selected from the group consisting of fatty acid based imidazolines, diethylenetriamine, tetraethylenetetramine, tetraethylenepentamine, or a combination thereof.

Embodiment 72

The asphaltene inhibitor composition of any of embodiments 69 to 71, wherein the phenol aldehyde resin is derived from an alkyl-substituted monophenol or unsubstituted monophenol or a combination thereof and an aldehyde.

Embodiment 73

The asphaltene inhibitor composition of embodiment 72, wherein the alkyl-substituted monophenol has a branched or linear $C_{1-20}$ alkyl substituent or a combination thereof, and the aldehyde comprises formaldehyde, paraformaldehyde, acetaldehyde, propionaldehyde, butyraldehyde, glyoxal, glutaraldehyde, 1,9-nonanedial, or a combination thereof.

Embodiment 74

The asphaltene inhibitor composition of any of embodiments 69 to 71, wherein the phenol aldehyde resin is of the structure:

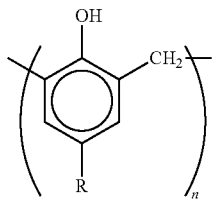

wherein R is —H or a $C_{1-20}$ linear or branched alkyl and n is greater than 2.

Embodiment 75

The asphaltene inhibitor composition of embodiment 74, wherein at least one R is a $C_{6-20}$ alkyl.

Embodiment 76

The asphaltene inhibitor composition of any of embodiments 69 to 71, wherein the phenol aldehyde resin has a structure represented by the formula:

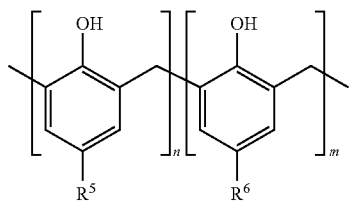

wherein $R^5$ is a $C_{1-20}$ linear or branched alkyl, $R^6$ is different from $R^5$ and is H or a linear or branched $C_{1-20}$ alkyl, and n and m are greater than 1.

Embodiment 77

The asphaltene inhibitor composition of embodiment 76, wherein $R^5$ is a $C_{7-16}$ linear or branched alkyl and $R^6$ is a $C_{1-6}$ linear or branched alkyl.

Embodiment 78

The asphaltene inhibitor composition of any of embodiments 42 to 77, wherein the ionic liquid and the asphaltene inhibitor form a complex.

Embodiment 79

The asphaltene inhibitor composition of any of embodiments 42 to 77, wherein the ionic liquid and the asphaltene inhibitor form a synergistic mixture.

Embodiment 80

The asphaltene inhibitor composition of embodiment 78 or 79, wherein the weight ratio of the asphaltene inhibitor to the ionic liquid in the complex or synergistic mixture is about 5:95 to about 3:1.

Embodiment 81

The asphaltene inhibitor composition of any of embodiments 42 to 77, wherein the ionic liquid and the asphaltene inhibitor form a reaction product.

Embodiment 82

The asphaltene inhibitor composition of embodiment 81, wherein the reaction product is formed from the reaction of the asphaltene inhibitor and the ionic liquid in a 5:95 to about 3:1 weight ratio.

Embodiment 83

A petroleum hydrocarbon fluid comprising the asphaltene inhibitor composition of any of embodiments 42 to 82.

Embodiment 84

The petroleum hydrocarbon fluid of embodiment 83, wherein the petroleum hydrocarbon fluid is crude oil, bitumen, diesel fuel, a coker distillate, alkylate, reformate, cycle oil, a hydrotreated hydrocarbon, petroleum fuel, biofuel, residual oil, fuel gas, flare gas, propane, butane, liquefied petroleum gas (LPG), natural gas liquid (NGL) or a refinery component.

Embodiment 85

The petroleum hydrocarbon fluid of embodiment 83 or 84, wherein the amount of the ionic liquid is about 5 ppm to about 150 ppm based on a total volume of the petroleum hydrocarbon fluid.

Embodiment 86

The petroleum hydrocarbon fluid of embodiment 83 or 84, wherein the amount of the asphaltene inhibitor composition is about 25 ppm to about 500 ppm based on a total volume of the petroleum hydrocarbon fluid.

Embodiment 87

A method of enhancing the productivity of a petroleum hydrocarbon fluid produced from a subterranean formation penetrated by a well, the method comprising introducing into the well the asphaltene inhibitor composition of any of embodiments 42 to 82.

Embodiment 88

A method of inhibiting, reducing or preventing the formation, agglomeration and/or accumulation of asphaltene deposits or inhibiting, preventing or reducing precipitation of asphaltene from a petroleum hydrocarbon fluid (a) in an underground reservoir; (b) onto a conduit or vessel; or (iii) in a refinery by contacting the fluid with the asphaltene inhibitor composition of any of embodiments 42 to 82.

Embodiment 89

A method of improving the stability of a petroleum hydrocarbon fluid comprising contacting the petroleum hydrocarbon fluid with the asphaltene inhibitor composition of any of embodiments 42 to 82.

Embodiment 90

The method of any of embodiments 87 to 89, wherein the ionic liquid and the asphaltene inhibitor form a complex prior to contacting the ionic liquid and asphaltene inhibitor with the petroleum hydrocarbon fluid.

Embodiment 91

The method of any of embodiments 87 to 89, wherein the ionic liquid and the asphaltene inhibitor form a complex after contacting the ionic liquid and asphaltene inhibitor with the petroleum hydrocarbon fluid.

Embodiment 92

The method of any of embodiments 42 to 82, wherein the ionic liquid and the asphaltene inhibitor forms a synergistic mixture.

Embodiment 93

The method of any of embodiments 90 to 92, wherein the weight ratio of the asphaltene inhibitor to the ionic liquid in the complex or synergistic mixture is about 5:95 to about 3:1.

Embodiment 94

The method of any of embodiments 42 to 82, wherein the ionic liquid and the asphaltene inhibitor form a reaction product.

Embodiment 95

The method of embodiment 94, wherein the reaction product is formed from the reaction of the asphaltene inhibitor and the ionic reactant in a 5:95 to about 3:1 weight ratio.

Embodiment 96

The method of embodiment 88 or 89, wherein the petroleum hydrocarbon fluid is contacted with the asphaltene inhibitor composition prior to loading the petroleum hydrocarbon fluid onto a transport vehicle.

Embodiment 97

The method of any of embodiments 88 or 89, wherein the petroleum hydrocarbon fluid is contacted with the asphaltene inhibitor composition during transport of the petroleum hydrocarbon fluid in a transport vehicle.

Embodiment 98

The method of any of embodiments 87 to 97, wherein the petroleum hydrocarbon fluid is crude oil, bitumen, diesel fuel, a coker distillate, alkylate, reformate, cycle oil, a hydrotreated hydrocarbon, petroleum fuel, biofuel, residual oil, fuel gas, flare gas, propane, butane, liquefied petroleum gas (LPG), natural gas liquid (NGL) or a refinery component.

Embodiment 99

The method of embodiment 98, wherein the petroleum hydrocarbon fluid is crude oil or bitumen.

Embodiment 100

A method of treating a petroleum hydrocarbon fluid, the method comprising: contacting the petroleum hydrocarbon fluid with a phenol aldehyde resin and an ionic liquid having a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene or a polyoxyalkylene group or a zwitterion; $R^8$ is a straight or branched $C_{1-30}$ alkylene, an alkylene oxyalkylene or an alkylene polyoxyalkylene; and the anion includes halides, hydroxyl, bicarbonate, carbonate, alkyl carbonates, alkoxides, carboxylates, hydroxycarboxylates or a combination thereof.

Embodiment 101

The method of embodiment 100, wherein at least one of $R^1$, $R^2$, $R^3$, $R^4$, $R^5$, $R^6$ and $R^7$ is a $C_{1-20}$ alkyl.

Embodiment 102

The method of embodiment 101, wherein at least one of $R^1$, $R^2$, $R^3$, $R^4$, $R^5$, $R^6$ and $R^7$ is a $C_{6-20}$ alkyl.

Embodiment 103

The method of embodiment 101 or 102, wherein at least two of wherein $R^1$, $R^2$, $R^3$, $R^4$, $R^5$, $R^6$ and $R^7$ are a $C_{6-20}$ alkyl.

Embodiment 104

The method of any of embodiments 100 to 103, wherein the basic anion is hydroxide.

Embodiment 105

The method of embodiment 100, wherein the ionic liquid comprises dicocodimethyl ammonium hydroxide, ditallowdimethyl ammonium hydroxide, tributylmethylammonium methyl carbonate, tetraethylammonium bicarbonate, tetrabutylammonium hydroxide, tallowtrimethyl ammonium hydroxide, cocotrimethyl ammonium hydroxide, hydrogenated tallow trimethyl ammonium hydroxide, dihydrogenated tallow dimethyl ammonium hydroxide, oxydiethylene bis(cocodimethylammonium hydroxide), or a combination thereof.

Embodiment 106

The method of any of embodiments 100 to 105, wherein the amount of the ionic liquid is about 5 ppm to about 150 ppm based on a total volume of the petroleum hydrocarbon fluid.

Embodiment 107

The method of any of embodiments 100 to 106, wherein the phenol aldehyde resin is derived from an alkyl-substituted monophenol or unsubstituted monophenol and an aldehyde.

Embodiment 108

The method of embodiment 107, wherein the alkyl-substituted monophenol has a branched or linear $C_{1-20}$ alkyl substituent or a combination thereof, and the aldehyde comprises formaldehyde, paraformaldehyde, acetaldehyde, propionaldehyde, butyraldehyde, glyoxal, glutaraldehyde, 1,9-nonanedial, or a combination thereof

Embodiment 109

The method of 107 or 108, wherein the phenol aldehyde resin has a structure represented by the formula

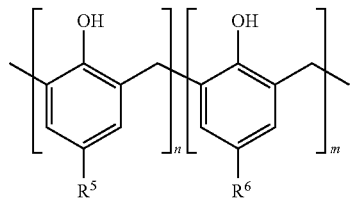

wherein $R^5$ is a $C_{1-20}$ linear or branched alkyl, $R^6$ is different from $R^5$ and is H or a linear or branched $C_{1-20}$ alkyl, and n and m are greater than 1.

Embodiment 110

The method of embodiment 109, wherein $R^5$ is a $C_{7-16}$ linear or branched alkyl and $R^6$ is a $C_{1-6}$ linear or branched alkyl.

Embodiment 111

The method of any of embodiments 100 to 110, wherein the amount of the phenol aldehyde resin is about 25 ppm to about 500 ppm based on a total volume of the petroleum hydrocarbon fluid.

Embodiment 112

The method of any of embodiments 100 to 111, wherein the petroleum hydrocarbon fluid further contains water, brine, a gas, or a combination thereof.

Embodiment 113

The method of any of embodiments 100 to 112, wherein the contacting is conducted during production, storage, transportation, or refining of the petroleum hydrocarbon fluid.

Embodiment 114

The method of any of embodiments 100 to 113, wherein the contacting is conducted at a temperature of about −50° C. to about 250° C. and a pressure of about 14.7 psia to about 40,000 psi

Embodiment 115

The method of any of embodiments 100 to 114, wherein the phenol aldehyde and the ionic liquid are separately added to the petroleum hydrocarbon fluid.

Embodiment 116

The method of any of embodiments 100 to 115, further comprising combining the phenol aldehyde with the ionic liquid to provide an asphaltene inhibitor composition, and adding the asphaltene inhibitor composition to the petroleum hydrocarbon fluid.

Embodiment 117

An asphaltene inhibitor composition comprising a phenol aldehyde resin; and an ionic liquid having a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene or a polyoxyalkylene group or a zwitterion; $R^8$ is a straight or branched $C_{1-30}$ alkylene, an alkylene oxyalkylene or an alkylene polyoxyalkylene; and the anion includes halides, hydroxyl, bicarbonate, carbonate, alkyl carbonates, alkoxides, carboxylates, hydroxycarboxylates or a combination thereof.

Embodiment 118

The asphaltene inhibitor composition of embodiment 117, wherein the weight ratio of the phenol aldehyde resin relative to the ionic liquid is about 99:1 to about 3:1.

Embodiment 119

The asphaltene inhibitor composition of embodiment 117 or 118, wherein at least of $R^1$, $R^2$, $R^3$, $R^4$, $R^5$, $R^6$ or $R^7$ is a $C_{6-20}$ alkyl.

Embodiment 120

The asphaltene inhibitor composition of embodiment 119, wherein at least two of $R^1$, $R^2$, $R^3$, $R^4$, $R^5$, $R^6$ or $R^7$ are a $C_{6-20}$ alkyl.

Embodiment 121

The asphaltene inhibitor composition of embodiment 117 or 118, wherein the ionic liquid comprises dicocodimethyl ammonium hydroxide, ditallowdimethyl ammonium hydroxide, tributylmethylammonium methyl carbonate, tetraethylammonium bicarbonate, tetrabutylammonium hydroxide, tallowtrimethyl ammonium hydroxide, cocotrimethyl ammonium hydroxide, hydrogenated tallow trimethyl ammonium hydroxide, dihydrogenated tallow dimethyl ammonium hydroxide, oxydiethylene bis (cocodimethylammonium hydroxide), or a combination thereof.

Embodiment 122

The asphaltene inhibitor composition of any of embodiments 100 to 121, wherein the phenol aldehyde resin is derived from an alkyl-substituted monophenol or unsubstituted monophenol or a combination thereof and an aldehyde.

What is claimed is:

1. A method of enhancing the performance of an asphaltene inhibitor during production, storage, transportation or refining of a petroleum hydrocarbon fluid, wherein the asphaltene inhibitor is a phenol aldehyde resin of the structure:

(a)

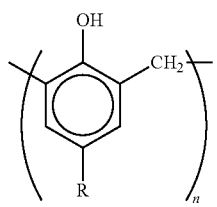

wherein R is —H or a $C_{1-20}$ linear or branched alkyl and n is greater than 2; or (b)

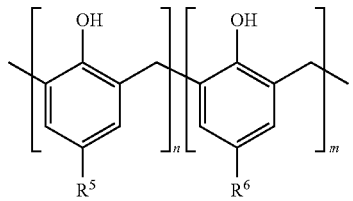

wherein $R^5$ is a $C_{1-20}$ linear or branched alkyl, $R^6$ is different from $R^5$ and is H or a linear or branched $C_{1-20}$ alkyl, and n and m are greater than 1, the method comprising contacting the asphaltene inhibitor with an ionic liquid during a production or refining operation or prior to or during storage or transportation of the petroleum hydrocarbon fluid, wherein the ionic liquid has a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene or a polyoxyalkylene group or a zwitterion; $R^8$ is a straight or branched $C_{1-30}$ alkylene, an alkylene oxyalkylene or an alkylene polyoxyalkylene; and the anion comprises halides, hydroxyl, bicarbonate, carbonate, alkyl carbonates, alkoxides, carboxylates, hydroxycarboxylates or a combination thereof.

2. The method of claim 1, wherein at least one of the following conditions prevail:

(a) $R^1$, $R^2$, $R^3$, $R^4$, $R^5$, $R^6$ and $R^7$ is —H or a $C_{1-20}$ alkyl;
(b) the oxyalkylene is of the formula HO—$R^{11}$— where $R^{11}$ is a $C_2$-$C_{10}$ alkylene group;
(c) the polyoxyalkylene group is of the formula H—[O—$R^{10}$—]$_z$, or H(O—$R^{11}$)$_x$—[O—$R^{11}$—]$_y$ where each occurrence of $R^{10}$ or $R^{11}$ is independently a $C_{1-10}$ alkylene, z is an integer greater than 1 and x and y are independently selected from 1 to 1500;
(d) the alkylene polyoxyalkylene group is of the formula (a) —$R^{12}$—[O—$R^{13}$—]$_y$, wherein $R^{12}$ is a $C_{1-30}$ alkylene, each occurrence of $R^{13}$ is independently a $C_{1-10}$ alkylene, and y is an integer from 1 to 500; or (b) —$R^{14}$—O—$R^{15}$—;
(e) the alkylene oxyalkylene group is of the formula —$R^{14}$—O—$R^{15}$—, wherein $R^{14}$ and $R^{15}$ are each independently a $C_{1-20}$, branched or straight chain alkylene;
(f) the weight ratio of the asphaltene inhibitor relative to the ionic liquid is about 99:1 to about 3:1; or
the asphaltene inhibitor is combined with an organic metal salt.

3. The method of claim 1, wherein the asphaltene inhibitor further contains an amine or polyamine additive.

4. The method of claim 3, wherein the amine or polyamine additive is selected from the group consisting of fatty acid based imidazolines, diethylenetriamine, tetraethylenetetramine, tetraethylenepentamine, or a combination thereof.

5. The method of claim 1, wherein $R^5$ is a $C_{7-16}$ linear or branched alkyl and $R^6$ is a $C_{1-6}$ linear or branched alkyl.

6. The method of claim 1, wherein the ionic liquid and the asphaltene inhibitor form a complex, a synergistic mixture or a reaction product.

7. The method of claim 1, wherein the ionic liquid comprises dicocodimethyl ammonium hydroxide, ditallowdimethyl ammonium hydroxide, tributylmethylammonium methyl carbonate, tetraethylammonium bicarbonate, tetrabutylammonium hydroxide, tallowtrimethyl ammonium hydroxide, cocotrimethyl ammonium hydroxide, hydrogenated tallow trimethyl ammonium hydroxide, dihydrogenated tallow dimethyl ammonium hydroxide, oxydiethylene bis(cocodimethylammonium hydroxide), or a combination thereof.

8. The method of claim 1, wherein the anion is a hydroxide, carbonate or bicarbonate.

9. The method of claim 1, wherein the anion is a carboxylate, hydroxycarboxylate, a Cis fatty acid, an alkoxide or a combination thereof.

10. A method of inhibiting, reducing or preventing the formation, agglomeration and/or accumulation of asphaltene deposits or inhibiting, preventing or reducing precipitation of asphaltene from a petroleum hydrocarbon fluid (a) in an underground reservoir; (b) onto a conduit or vessel; or (iii) in a refinery by contacting the fluid with a composition comprising:

(A) an asphaltene inhibitor of a phenol aldehyde resin of the structure:

(i)

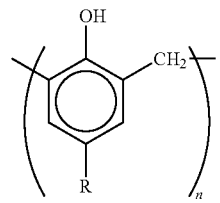

wherein R is —H or a $C_{1-20}$ linear or branched alkyl and n is greater than 2; or (ii)

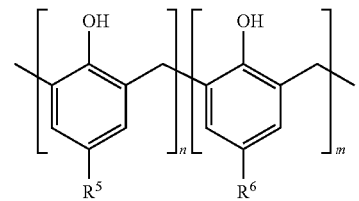

wherein $R^5$ is a $C_{1-20}$ linear or branched alkyl, $R^6$ is different from $R^5$ and is H or a linear or branched $C_{1-20}$ alkyl, and n and m are greater than 1, and (B) an ionic liquid comprising a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene or a polyoxyalkylene group or a zwitterion; $R^8$ is a straight or branched $C_{1-30}$ alkylene, an alkylene oxyalkylene or an alkylene polyoxyalkylene; and the anion comprises halides, hydroxyl, bicarbonate, carbonate, alkyl carbonates, alkoxides, carboxylates, hydroxycarboxylates or a combination thereof.

11. The method of claim 10, wherein at least one of the following conditions prevail:
(a) $R^1$, $R^2$, $R^3$, $R^4$, $R^5$, $R^6$ and $R^7$ is —H or a $C_{1-20}$ alkyl;
(b) the oxyalkylene is of the formula HO—$R^{11}$— where $R^{11}$ is a $C_2$-$C_{10}$ alkylene group;
(c) the polyoxyalkylene group is of the formula H—[O—$R^{10}$—]$_z$, or H(O—$R^{11}$)$_x$—[O—$R^{11}$—]$_y$ where each occurrence of $R^{10}$ or $R^{11}$ is independently a $C_{1-10}$ alkylene, z is an integer greater than 1 and x and y are independently selected from 1 to 1500;
(d) the alkylene polyoxyalkylene group is of the formula (a) —$R^{12}$—[O—$R^{13}$—]$_y$, wherein $R^{12}$ is a $C_{1-30}$ alkylene, each occurrence of $R^{13}$ is independently a $C_{1-10}$ alkylene, and y is an integer from 1 to 500; or (b) —$R^{14}$—O—$R^{15}$—;
(e) the alkylene oxyalkylene group is of the formula —$R^{14}$—O—$R^{15}$—, wherein $R^{14}$ and $R^{15}$ are each independently a $C_{1-20}$, branched or straight chain alkylene;
(f) the weight ratio of the asphaltene inhibitor relative to the ionic liquid is about 99:1 to about 3:1; or
the asphaltene inhibitor is combined with an organic metal salt.

12. The method of claim 10, wherein the asphaltene inhibitor further contains an amine or polyamine additive.

13. The method of claim 12, wherein the amine or polyamine additive is selected from the group consisting of fatty acid based imidazolines, diethylenetriamine, tetraethylenetetramine, tetraethylenepentamine, or a combination thereof.

14. The method of claim 10, wherein $R^5$ is a $C_{7-16}$ linear or branched alkyl and $R^6$ is a $C_{1-6}$ linear or branched alkyl.

15. The method of claim 10, wherein the ionic liquid comprises dicocodimethyl ammonium hydroxide, ditallowdimethyl ammonium hydroxide, tributylmethylammonium methyl carbonate, tetraethylammonium bicarbonate, tetrabutylammonium hydroxide, tallowtrimethyl ammonium hydroxide, cocotrimethyl ammonium hydroxide, hydrogenated tallow trimethyl ammonium hydroxide, dihydrogenated tallow dimethyl ammonium hydroxide, oxydiethylene bis(cocodimethylammonium hydroxide), or a combination thereof.

16. The method of claim 10, wherein the ionic liquid and the asphaltene inhibitor form a complex, a synergistic mixture or a reaction product.

17. The method of claim 10, wherein the anion is a carboxylate, hydroxycarboxylate, a $C_{18}$ fatty acid, an alkoxide or a combination thereof.

18. A method of treating a petroleum hydrocarbon fluid, the method comprising: contacting the petroleum hydrocarbon fluid with:
(I) a phenol aldehyde resin of the structure:
a)

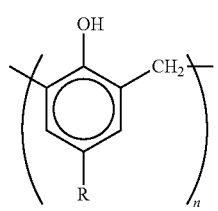

wherein R is —H or a $C_{1-20}$ linear or branched alkyl and n is greater than 2; or
(b)

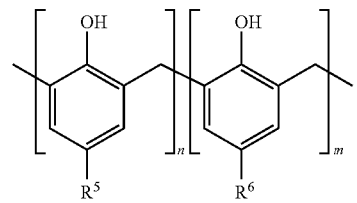

wherein $R^5$ is a $C_{1-20}$ linear or branched alkyl, $R^6$ is different from $R^5$ and is H or a linear or branched $C_{1-20}$ alkyl, and n and m are greater than 1; and
(II) an ionic liquid having a cation of $R^1R^2R^3R^4N^+$ or $R^1R^2R^3N^+R^8N^+R^5R^6R^7$ and an anion, wherein $R^1$, $R^2$, $R^3$, $R^4$, $R^5$, $R^6$ and $R^7$ are independently selected from hydrogen, a straight or branched $C_{1-30}$ alkyl group, benzyl, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, an oxyalkylene or a polyoxyalkylene group or a zwitterion; $R^8$ is a straight or branched $C_{1-20}$ alkylene, an alkylene oxyalkylene or an alkylene polyoxyalkylene; and the anion comprise, hydroxyl, bicarbonate, carbonate, alkyl carbonates, alkoxides, carboxylates, hydroxycarboxylates or a combination thereof.

19. The method of claim 18, wherein at least one of the following conditions prevail:
(a) $R^1$, $R^2$, $R^3$, $R^4$, $R^5$, $R^6$ and $R^7$ is —H or a $C_{1-20}$ alkyl;
(b) the oxyalkylene is of the formula HO—$R^{11}$— where $R^{11}$ is a $C_2$-$C_{10}$ alkylene group;
(c) the polyoxyalkylene group is of the formula H—[O—$R^{10}$—]$_z$, or H(O—$R^{11}$)$_x$—[O—$R^{11}$—]$_y$ where each occurrence of $R^{10}$ or $R^{11}$ is independently a $C_{1-10}$ alkylene, z is an integer greater than 1 and x and y are independently selected from 1 to 1500;
(d) the alkylene polyoxyalkylene group is of the formula (a) —$R^{12}$—[O—$R^{13}$—]$_y$, wherein $R^{12}$ is a $C_{1-30}$ alkylene, each occurrence of $R^{13}$ is independently a $C_{1-10}$ alkylene, and y is an integer from 1 to 500; or (b) —$R^{14}$—O—$R^{15}$—;
(e) the alkylene oxyalkylene group is of the formula —$R^{14}$—O—$R^{15}$—, wherein $R^{14}$ and $R^{15}$ are each independently a $C_{1-20}$, branched or straight chain alkylene; or
(f) the weight ratio of the asphaltene inhibitor relative to the ionic liquid is about 99:1 to about 3:1;
(g) the asphaltene inhibitor is combined with an organic metal salt.

20. The method of claim 18, wherein the asphaltene inhibitor further contains an amine or polyamine additive.

21. The method of claim 18, wherein the ionic liquid and the phenol aldehyde resin form a complex, a synergistic mixture or a reaction product.

22. The method of claim 21, wherein the ionic liquid and the asphaltene inhibitor form a complex or synergistic mixture and wherein the weight ratio of the asphaltene inhibitor to the ionic liquid in the complex or synergistic mixture is about 5:95 to about 3:1.

23. The method of claim 18, wherein the ionic liquid comprises dicocodimethyl ammonium hydroxide, ditallowdimethyl ammonium hydroxide, tributylmethylammonium methyl carbonate, tetraethylammonium bicarbonate, tetrabutylammonium hydroxide, tallowtrimethyl ammonium hydroxide, cocotrimethyl ammonium hydroxide, hydrogenated tallow trimethyl ammonium hydroxide, dihydrogenated tallow dimethyl ammonium hydroxide, oxydiethylene bis(cocodimethylammonium hydroxide), or a combination thereof.

24. The method of claim 18, wherein the anion is a carboxylate, hydroxycarboxylate, a $C_{18}$ fatty acid, an alkoxide or a combination thereof.

25. The method of claim 18, wherein at least one of $R^1$, $R^2$, $R^3$, $R^4$, $R^5$, $R^6$ and $R^7$ is —H or a $C_{1-20}$ alkyl.

26. The method of claim 18, wherein the polyoxyalkylene group is of the formula $H—[O—R^{10}—]_z$, where each occurrence of $R^{10}$ is independently a $C_{1-10}$ alkylene and z is an integer greater than 1.

* * * * *